United States Patent
Kunieda et al.

(10) Patent No.: US 11,074,734 B2
(45) Date of Patent: Jul. 27, 2021

(54) IMAGE PROCESSING APPARATUS, IMAGE PROCESSING METHOD AND STORAGE MEDIUM

(71) Applicant: CANON KABUSHIKI KAISHA, Tokyo (JP)

(72) Inventors: Hiroyasu Kunieda, Yokohama (JP); Takayuki Yamada, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/390,809

(22) Filed: Apr. 22, 2019

(65) Prior Publication Data
US 2019/0325627 A1  Oct. 24, 2019

(30) Foreign Application Priority Data
Apr. 23, 2018 (JP) .............................. JP2018-082582

(51) Int. Cl.
*G06K 9/00* (2006.01)
*G06T 11/60* (2006.01)

(52) U.S. Cl.
CPC .......... *G06T 11/60* (2013.01); *G06T 2200/24* (2013.01)

(58) Field of Classification Search
CPC ......... G06T 11/60; G06T 11/00; G06T 15/00; G06T 2207/10016; G06T 2207/30201; G06T 2207/30241; G06T 7/251; G06T 7/11; G06T 11/001; G06T 11/206; G06T 11/80; G06T 2200/32; G06T 2207/20101; G06T 2207/20212; G06T 2215/16; G06T 7/143; G06T 7/194; G06T 15/04; G06F 16/24578; G06F 16/90324; G06F 3/04842; G06F 3/0488; G06F 3/0482; G06F 3/04845; G06F 16/535; G06F 16/538; G06F 16/54; G06F 16/55; G06F 16/5838; G06F 16/5862; G06F 1/1626; G06F 2203/04806; G06F 3/011
See application file for complete search history.

(56) References Cited

U.S. PATENT DOCUMENTS

| | | | |
|---|---|---|---|
| 10,013,395 B2 | 7/2018 | Kajiwara et al. | |
| 10,275,652 B2 | 4/2019 | Yamamoto et al. | |
| 10,290,135 B2 | 5/2019 | Mizoguchi et al. | |
| 2006/0269151 A1* | 11/2006 | Sakuyama | H04N 19/647 382/232 |
| 2011/0285748 A1* | 11/2011 | Slatter | G06T 11/60 345/629 |
| 2018/0165538 A1 | 6/2018 | Iguchi et al. | |
| 2018/0167521 A1 | 6/2018 | Iguchi et al. | |

FOREIGN PATENT DOCUMENTS

JP      2007-013467 A      1/2007

* cited by examiner

*Primary Examiner* — Alex Kok S Liew
(74) *Attorney, Agent, or Firm* — Venable LLP

(57) ABSTRACT

An image processing apparatus includes at least one processor causing the image processing apparatus to act as an acquisition unit configured to acquire a plurality of images, a determination unit configured to determine a template on which one or more images selected from the plurality of images are arranged, and a layout unit configured to arrange the selected one or more images in slots within the determined template. In a case when the determined template includes a background slot and a foreground slot that overlaps a part of the background slot, the layout unit arranges, into the background slot, one image out of the selected one or more images and also arranges, into the foreground slot, the one image.

29 Claims, 24 Drawing Sheets

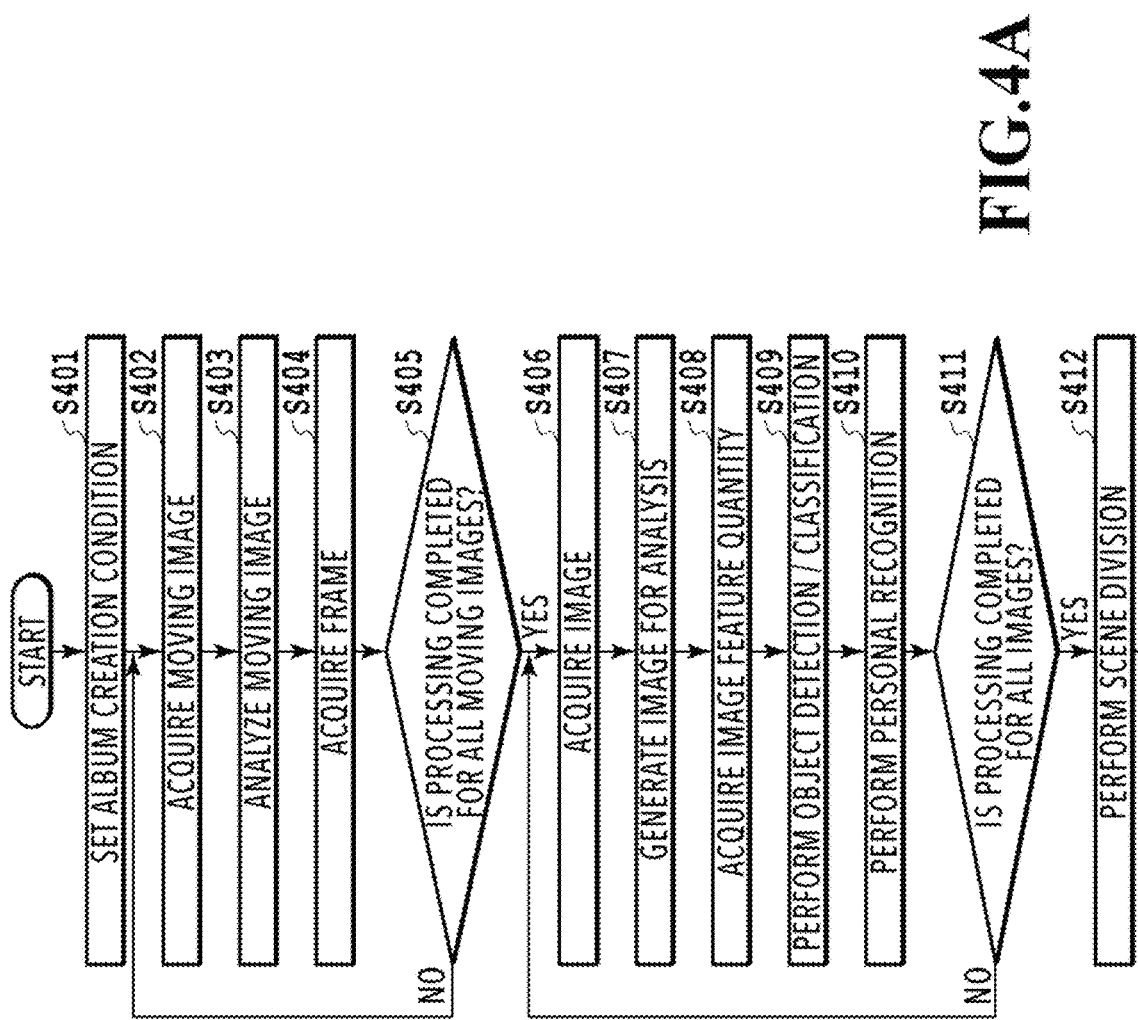

| Image ID | Date of image capturing | Kind of image | Focus | Object classification | | | | | | | Number of faces | Personal ID | | | | | | ... |
|---|---|---|---|---|---|---|---|---|---|---|---|---|---|---|---|---|---|---|
| | | | | TOP1 | | TOP2 | | TOP3 | | | | 1 | | 2 | | 3 | | |
| | | | | Category | Reliability | Category | Reliability | Category | Reliability | | | Top-left position | Bottom-right position | Top-left position | Bottom-right position | Top-left position | Bottom-right position | |
| 1 | 2015/7/1 10h1m12s | still image | ○ | person | 90 | - | - | - | - | | 6 | 40,40 | 65,65 | 90,40 | 115,65 | 10,20 | 25,35 | ... |
| 2 | 2015/7/1 10h12m30s | moving image | ○ | person | 80 | animal | 40 | - | - | | 2 | 50,100 | 100,150 | 150,125 | 190,165 | 150,125 | 190,165 | ... |
| 3 | 2015/7/1 10h15m54s | SNS | ○ | animal | 70 | person | 10 | dish | 5 | | 0 | - | - | - | - | - | - | ... |
| ... | | | ... | ... | ... | ... | ... | ... | ... | | ... | ... | ... | ... | ... | ... | ... | ... |

FIG.5

| Scene | Image capturing period | | Number of captured images | | Number of captured persons | |
|---|---|---|---|---|---|---|
| | average | standard deviation | average | standard deviation | average | standard deviation |
| journey | 33.221 | 4.778 | 324.857 | 393.691 | 1.506 | 0.256 |
| daily life | 3.336 | 4.671 | 54.892 | 108.805 | 1.465 | 0.974 |
| ceremony | 4.634 | 1.532 | 165.457 | 71.055 | 2.547 | 0.527 |

FIG.7

| Scene | Main slot image features | Sub slot image features |
|---|---|---|
| journey | zoomed-out image in which a person and a scenery are included | image of a zoomed-in face or a face in profile |
| daily life | image of a zoomed-in face or a face in profile | zoomed-out image in which a person and a scenery are included |
| ceremony | image in which the distance between two persons is small | image in which a large number of persons are included |

FIG.8A

| Image ID | Score (fifty-point scale) ||
| | main slot (points) | sub slot (points) |
|---|---|---|
| 1 | 20 | 40 |
| 2 | 45 | 10 |
| 3 | 10 | 20 |
| ... | ... | ... |

FIG.8B

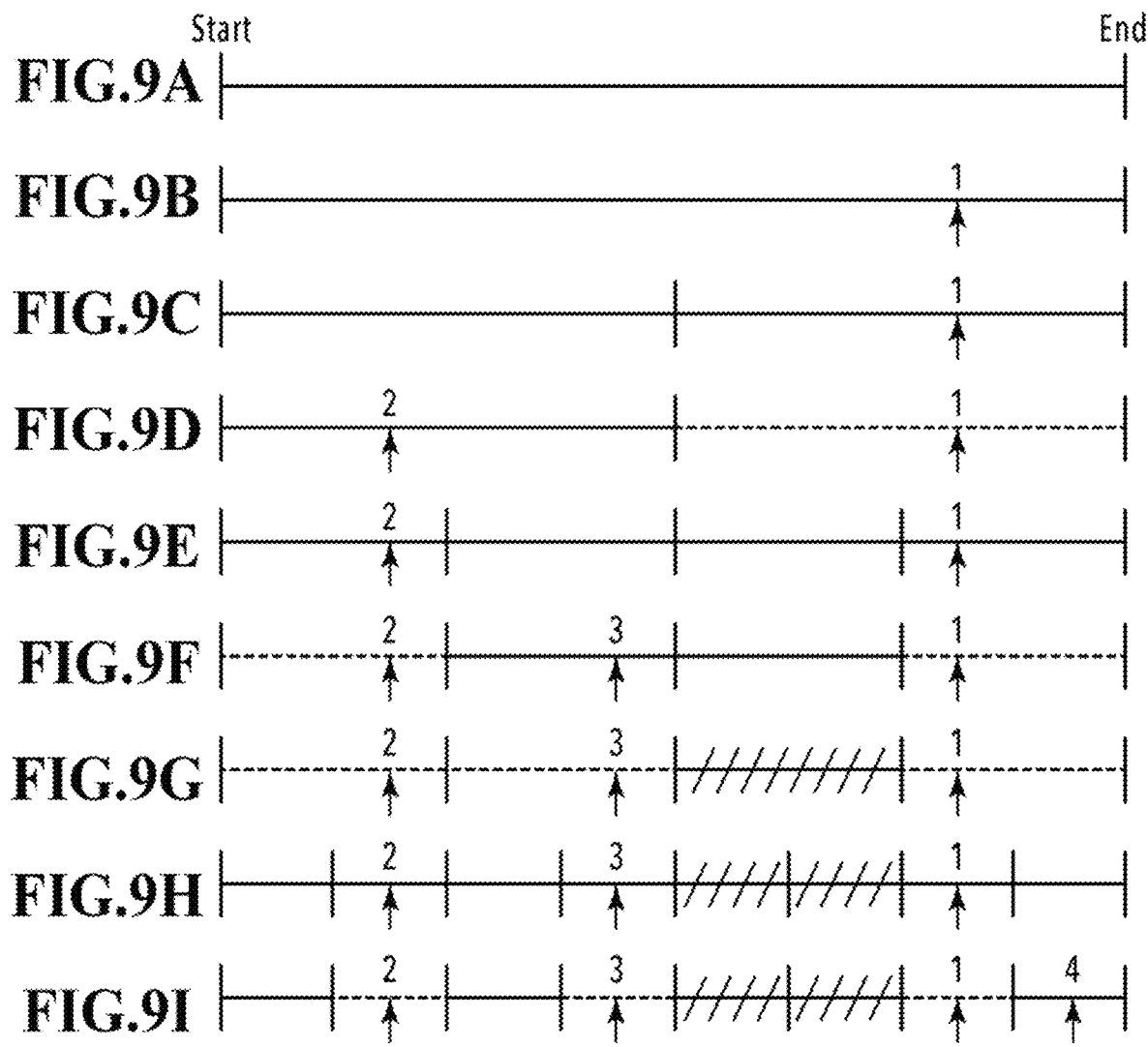

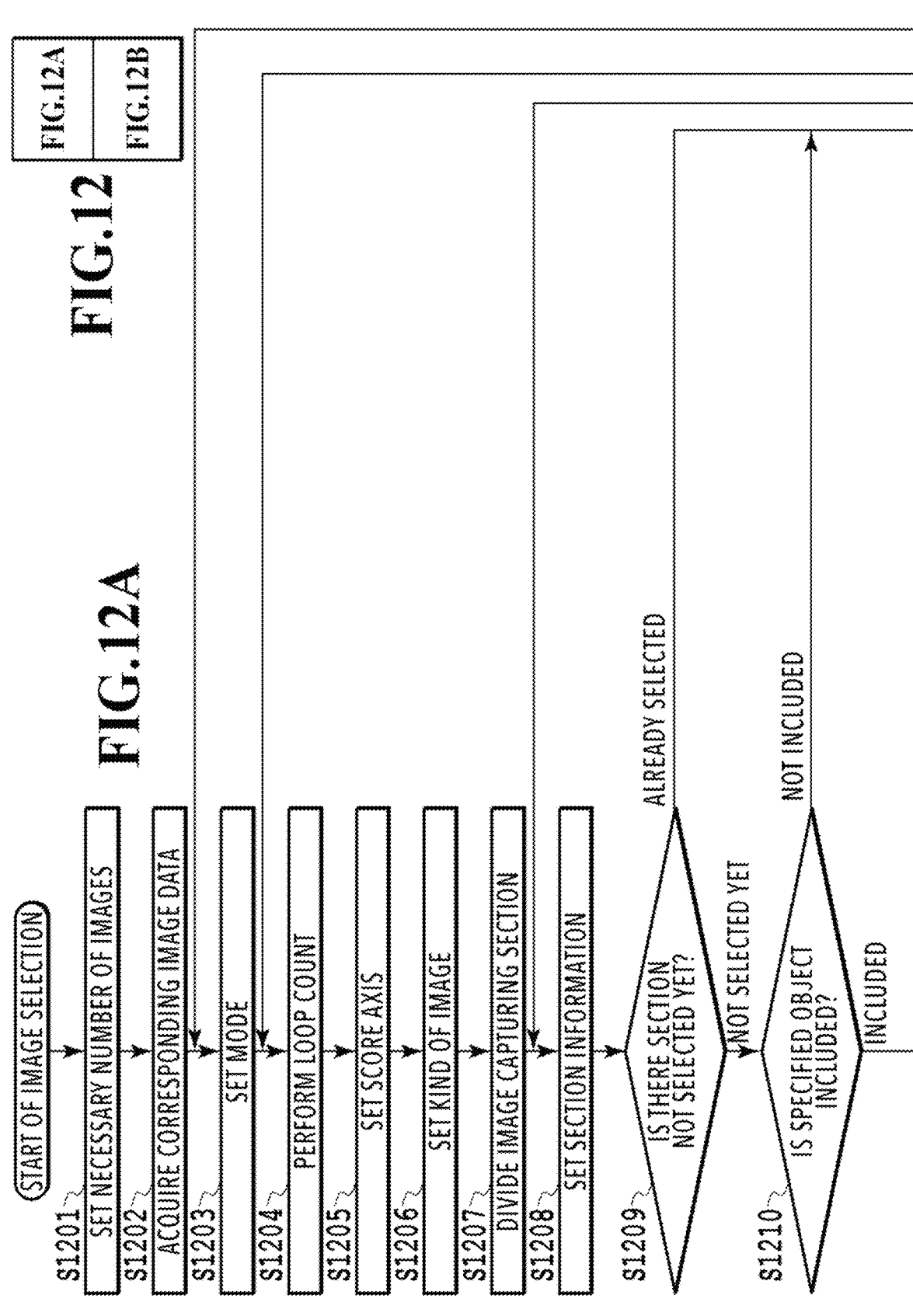

ly laid out.
IMAGE PROCESSING APPARATUS, IMAGE PROCESSING METHOD AND STORAGE MEDIUM This application claims the benefit of Japanese Patent Application No. 2018-082582 filed Apr. 23, 2018, which is hereby incorporated by reference herein in its entirety.

BACKGROUND OF THE INVENTION

Field of the Invention

The present invention relates to an image processing apparatus for automatically laying out images, an image processing method, and a storage medium.

Description of the Related Art

As the digital camera, or the like, is prevailing, in recent years, software for editing images captured by a user and automatically creating album data is provided. In software such as this, by a user selecting a preferred template as well as preparing image data the user desires to include in an album, a plurality of pieces of image data is automatically laid out.

Japanese Patent Laid-Open No. 2007-013467 has disclosed a method in which the center of an image is moved within a laid-out area so that a main object of an image in the lower layer is not hidden by an image in the upper layer while laying out a plurality of images (photos) by partially overlapping one another.

On the other hand, in recent years, software is provided that automatically lays out one or more images on a foreground while displaying one piece of image data (photo) provided by a user as a background of the entire area of a double-page spread or one-side page of an album.

SUMMARY OF THE INVENTION

However, in the image selected as a background, a part of the area is hidden by one or a plurality of foreground images. In this case, even by moving the center of the image as in Japanese Patent Laid-Open No. 2007-013467, the part of the area of the background image remains undisplayed, and, therefore, there is a case when a feeling of incongruity is given to a user.

The present invention has been made in order to solve the above-described problem. Consequently, an object thereof is to provide an image processing method capable of laying out a background image and a foreground image without giving a feeling of incongruity to a user.

According to a first aspect, the present invention provides an image processing apparatus comprising an acquisition unit configured to acquire a plurality of images, a determination unit configured to determine a template on which one or more images selected from the plurality of images are arranged, and a layout unit configured to arrange the selected one or more images in slots within the determined template, wherein the layout unit arranges, in a case when the determined template includes a background slot and a foreground slot that overlaps part of the background slot, an identical image of the selected one or more images in the background slot and in the foreground slot.

According to a second aspect, the present invention provides a storage medium storing a program for causing one or more computers to function as each unit of an image processing apparatus, the image processing apparatus comprising an acquisition unit configured to acquire a plurality of images, a determination unit configured to determine a template on which one or more images selected from the plurality of images are arranged, and a layout unit configured to arrange the selected one or more images in slots within the determined template, wherein the layout unit arranges, in a case when the determined template includes a background slot and a foreground slot that overlaps part of the background slot, an identical image of the selected one or more images in the background slot and in the foreground slot.

According to a third aspect, the present invention provides an image processing method comprising acquiring a plurality of images, determining a template on which one or more images selected from the plurality of images are arranged, and arranging the selected one or more images in slots within the determined template, wherein, in a case when the determined template includes a background slot and a foreground slot that overlaps part of the background slot, an identical image of the selected one or more images is arranged in the background slot and in the foreground slot.

Further features of the present invention will become apparent from the following description of exemplary embodiments with reference to the attached drawings.

BRIEF DESCRIPTION OF THE DRAWINGS

FIG. 4 is a diagram showing the relationship of FIGS. 4A and 4B.

FIG. 4A is a flowchart for explaining an automatic layout method.

FIG. 5 is a diagram showing an example of image analysis information of each piece of image data.

FIG. 7 is a diagram showing an example of an average value and a standard deviation of each of the image capturing period, the number of captured images, and the number of captured persons.

FIG. 8A and FIG. 8B are diagrams showing examples of criteria of image scoring and score results.

FIG. 9A to FIG. 9I are diagrams showing an example in which images are selected from a sub image group.

FIG. 12 is a diagram showing the relationship of FIGS. 12A and 12B.

FIG. 12A is a flowchart for explaining steps of image selection.

DESCRIPTION OF THE EMBODIMENTS

First Embodiment

In the following, an embodiment of the present invention is explained with reference to the drawings.

In the present embodiment, a method of generating an automatic layout by running an application for album creation in an image processing apparatus is explained by taking an example.

Figure 1:
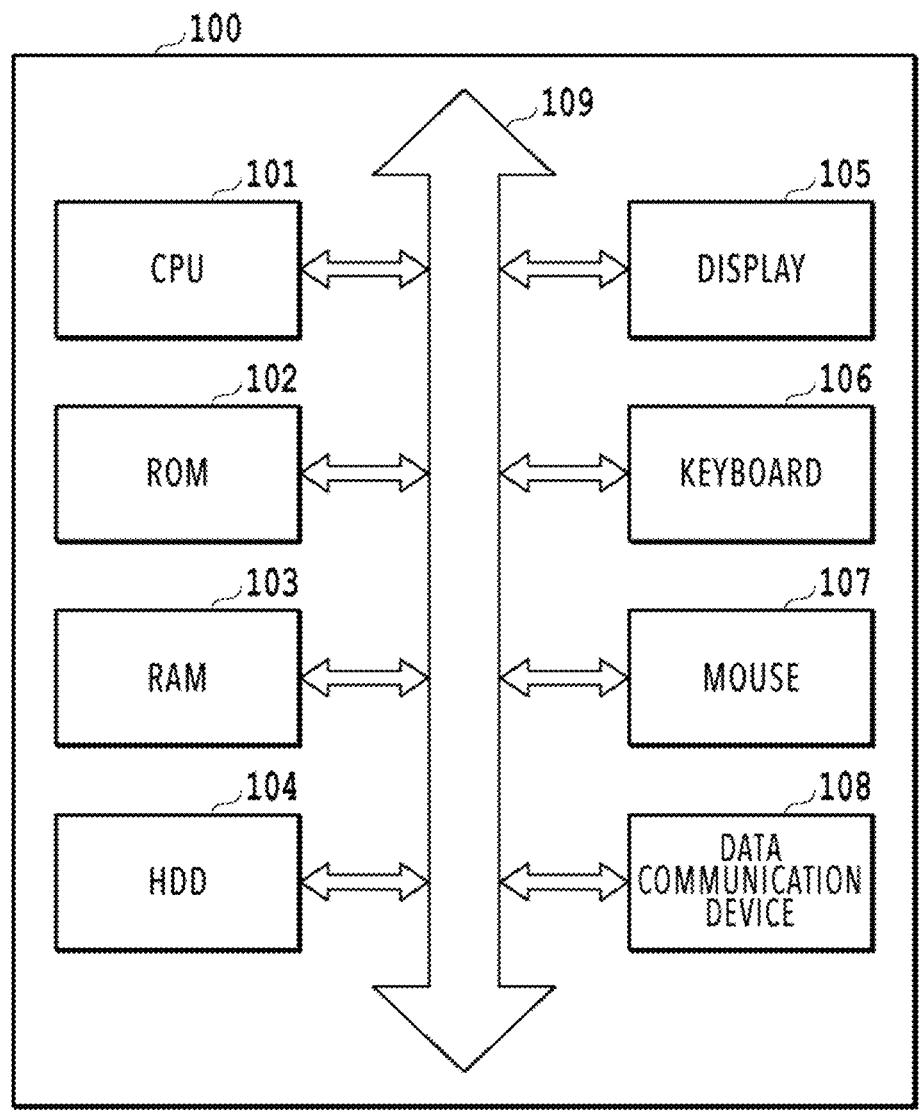
FIG. 1 is a block diagram explaining a configuration of hardware of an image processing apparatus.

FIG. 1 is a block diagram explaining a configuration of hardware of an image processing apparatus 100 according to the present invention. As the image processing apparatus 100, for example, mention is made of a PC, a smartphone, and so on, and, in the present embodiment, it is assumed that a PC is adopted.

In FIG. 1, the image processing apparatus 100 includes a CPU 101, a ROM 102, a RAM 103, an HDD 104, a display 105, a keyboard 106, a mouse 107, and a data communication device 108. These are connected to one another by a data bus 109.

The CPU (Central Processing Unit/processor) 101 is a system control unit and controls the entire image processing apparatus 100. Further, the CPU 101 performs an image processing method, to be explained in the present embodiment, in accordance with a program. In FIG. 1, one CPU is shown, but this is not limited, and two or more CPUs may be included.

In the ROM 102, programs executed by the CPU 101 and parameters are stored. The RAM 103 is used as a work memory for temporarily storing various kinds of information and performing processing at the time of execution of a program by the CPU 101. The HDD (hard disk) 104 is a storage medium for storing a database, or the like, holding image files and processing results of an image analysis. In the present embodiment, an application program for album creation, to be described later, is stored in the HDD 104.

The display 105 is a device that presents a UI (User Interface) of the present embodiment and layout results of images to a user. The display 105 may include a touch sensor function. The keyboard 106 is one of input devices and used, for example, to input predetermined information onto the UI displayed on the display 105. The mouse 107 is one of input devices and used, for example, to click a button on the UI displayed on the display 105.

The data communication device 108 is a device for communicating with an external device, such as a printer and a server. For example, it is possible to transmit data of an automatic layout created by the CPU 101 to a printer or a server connected to the outside via the data communication device 108.

The data bus 109 connects each of the units (102 to 108) described above and the CPU 101.

Figure 2:
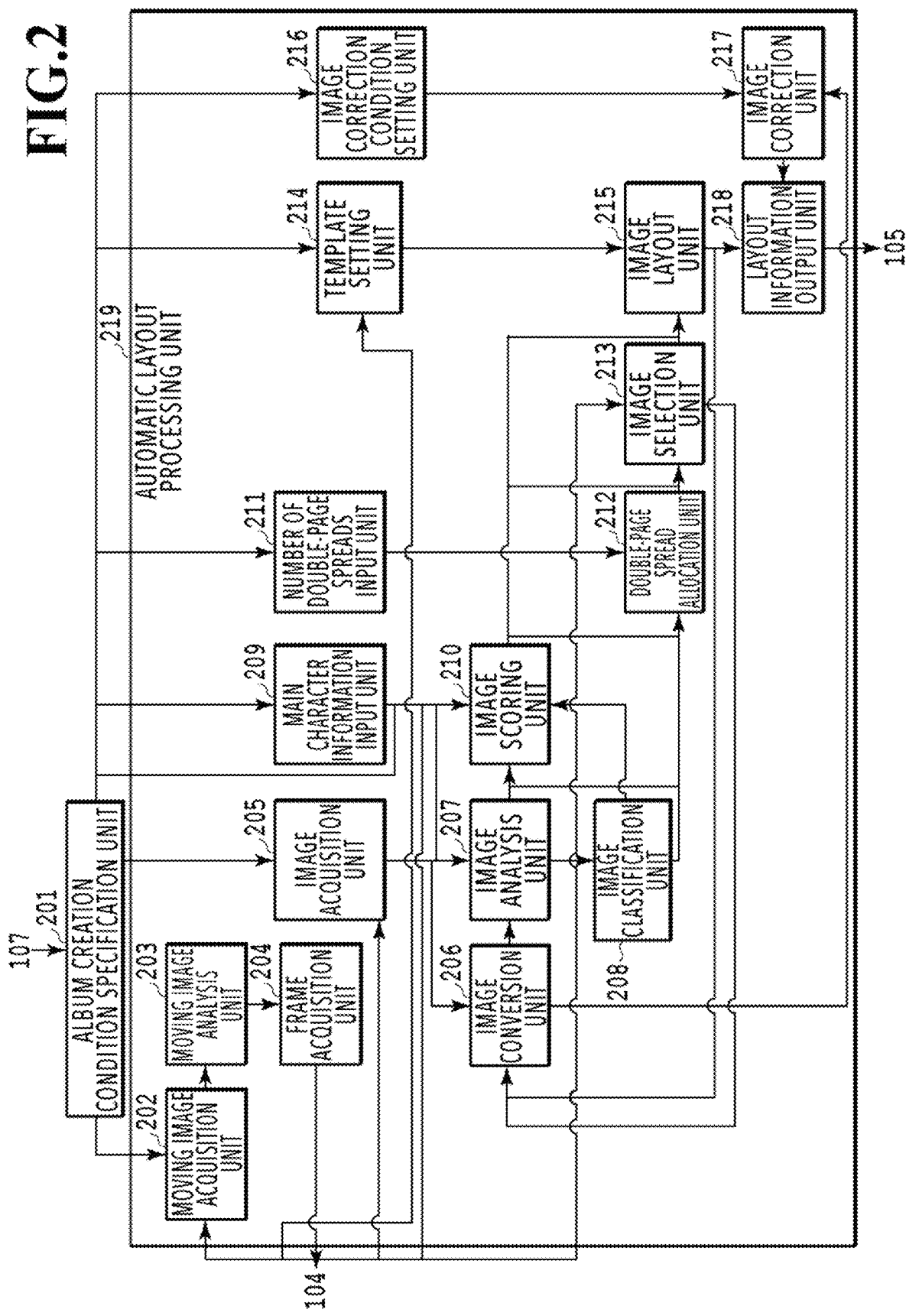
FIG. 2 is a software block diagram of an album creation application.

FIG. 2 is a software block diagram of an album creation application according to the present invention. In the present embodiment, the application is saved in the HDD 104 and run by a user clicking an icon displayed on the user display 105.

The album creation application has a variety of functions and, in the present embodiment, in particular, an automatic layout function provided by an automatic layout processing unit 219 is explained. As shown in FIG. 2, the application includes an album creation condition specification unit 201 and the automatic layout processing unit 219. The automatic layout function is a function for generating an album image to be displayed on the display 105 by classifying captured photos according to contents and attribute thereof or selecting and laying out photos.

The album creation condition specification unit 201 specifies album creation conditions to the automatic layout processing unit 219 in accordance with a UI operation by the mouse 107. In the present embodiment, it is possible to specify, as album creation conditions, a main character, the number of double-page spreads, the kind of template, the album creation mode, whether or not to perform image correction, the number of double-page spread photos adjusting the number of photos to be arranged per double-page spread of an album, and a commodity material by which an album is created. It may also be possible to specify an image or a moving image from which an image is cut out, which is laid out on an album, by attached information and attribute information of each piece of image data, for example, such as the date of image capturing, or based on the structure of a file system including image and moving image data, such as a device and a directory. In the present specification, the "double-page spread" corresponds to one display window in terms of display and is typically an area corresponding to two pages in printing, and indicates a pair of pages printed on a sheet and adjacent to each other, which a user can appreciate at a glance.

A moving image acquisition unit 202 acquires a moving image group (moving image data group) specified by the album creation condition specification unit 201 from the HDD 104. The moving image group referred to here refers to a candidate moving image group made use of for the layout of an image cut out from a moving image at the time of creation of one album. The acquired moving image data is decompressed in advance from the compressed state by using a decoder for a moving image mounted as a standard decoder in the OS so that the acquired moving image data can be analyzed.

A moving image analysis unit 203 analyzes the moving image data acquired by the moving image acquisition unit 202. In the analysis, successive frames are cut out from the moving image and an amount of difference between two successive frames is calculated. In a case when the amount of difference is large, the two successive frames are not similar, and, therefore, it is determined that the frames are those whose amount of movement is large. In a case when the amount of difference is small, it is determined that the two successive frames are similar. Regarding the amount of movement, it may also be possible to make use of a movement vector that is made use of in the moving image format other than the difference between two successive frames described previously.

The moving image analysis unit 203 selects a frame that is taken to be the target of the analysis from the determined amount of movement. Based on the amount of movement, it is possible to classify sections into sections in which there is movement and sections in which there is no movement. For the section for which it is determined that the amount of movement is large, the interval between analysis-target frames is made short and for the section for which it is determined that the amount of movement is small, the interval between analysis-target frames is made long. For example, in the section whose amount of movement is large, every five frames are taken to be the analysis target and in the section whose amount of movement is small, the first, the last, and the middle frames in the section are taken to be the analysis target.

After this, the moving image analysis unit 203 performs analysis processing for the analysis-target frame and scores the frame. As the items of the analysis, mention is made of object detection made use of for the layout of a face, an animal, and so on, object size determination, regarding the face, smiling face determination, closed-eyes determination, shake/blur determination, and entire image brightness determination, and a score is calculated in accordance with the result of each determination item.

In the object detection, in a case when the detected object is included within the frame, a high score is given. In the object size determination, in a case when the size of the detected object is large, a high score is given. In the smiling face determination, the larger the number of faces determined to be a smiling face, the higher a score is given and, in the closed-eyes determination, the larger the number of faces whose eyes are not closed, the higher a score is given. In the shake/blur determination, the edge amount of an image is calculated by a Laplacian filter and the larger the edge amount, the less the blur, and, therefore, the higher a score is given. As for the entire image brightness, in a case when the average luminance of the image is higher than or equal to a predetermined value, a high score is given. Finally, a total score, which is a sum total of the scores for each item, is calculated.

In addition, it may also be possible to change the area for which shake/blur is determined in accordance with the determined amount of movement. For example, in a case of tracking an object that is moving at the time of capturing a moving image, the object is captured clearly, but the background blurs, and, therefore, the image is blurred as a whole. Because of this, in a case when the amount of movement is large, a method of determining the amount of blur only in the object area, such as the face, is considered. A frame whose total score calculated from each section in which there is movement and each section in which there is no movement is higher than or equal to a predetermined value is determined to be the best shot.

A frame acquisition unit 204 cuts out a frame from a moving image based on the results of the analysis of the moving image analysis unit 203 and saves the frame in the HDD 104 as image data. At this time, in association with the cutout image data, information on the amount of movement determined by the moving image analysis unit 203, the camera work, the score, and so on is saved. At the time of saving, it may also be possible to save the image data also in association with the use as, such as an image made use of for an album based on the determined score and a candidate image made use of for a user to replace after the creation of an album.

An image acquisition unit 205 acquires an image group (image data group) specified by the album creation condition specification unit 201 from the HDD 104. The image group referred to here refers to an image group that is a candidate to be laid out at the time of creation of one album. For example, in a case when the album creation condition specification unit 201 specifies January 1, XXXX, to December 31, XXXX, all the images captured between January 1, XXXX, and December 31, XXXX, correspond to the specified image group. The image acquisition unit 205 also acquires information on the width and height of each image in the corresponding image group.

As the image saved in the HDD 104, mention is made of a still image and an image cut out from a moving image. The still image or the cutout image is one acquired from an image capturing device, such as a digital camera and a smart device. The image capturing device may be included in the image processing apparatus 100 or included in an external device. In a case when the image capturing device is an external device, an image is acquired via the data communication device 108. Further, the still image or the cutout image may be an image acquired from a network or a server via the data communication device 108. As the image acquired from a network or a server, mention is made of a social networking service image (hereafter, referred to as "SNS image"). A program that is executed by the CPU 101 analyzes data attached to the image and determines the source of saving for each image. For the SNS image, it may also be possible to manage the acquisition destination within an application by acquiring the image from the SNS via the application. The image is not limited to those described above, and another kind of image may also be used.

An image conversion unit 206 converts the number of pixels and color information of image data. In the present embodiment, image data is subjected to resolution conversion so that the number of pixels of a short side is 420 and subjected to color conversion so that each pixel is represented by sRGB standard color information.

An image analysis unit 207 performs analysis processing for image data already converted by the image conversion unit 206. Specifically, the image analysis unit 207 detects features from image data and performs the object determination, the face detection, the detected face expression recognition, the detected face personal recognition, and so on. Further, the image analysis unit 207 also acquires the date of image capturing from data (for example, Exif information) attached to the image acquired from the HDD 104.

An image classification unit 208 performs scene division for the acquired image group, that is, for the image group specified by the album creation condition specification unit 201. The scene division is performed by using date of image capturing information, number of images information, and detected face information. The scene may be an image capturing scene of, such as a journey, a daily life, a wedding ceremony, and so on, or may be a set of images captured at the time of image capturing during a certain period for one image capturing target.

A main character information input unit 209 inputs an ID (identification information) of a main character specified by the album creation condition specification unit 201 to an image scoring unit 210.

The image scoring unit 210 scores each image so that an image suitable to the layout of an album is given a high score based on information obtained from the image analysis unit 207 and the image classification unit 208.

A number of double-page spreads input unit 211 inputs the number of double-page spreads of an album specified by the album creation condition specification unit 201 to a double-page spread allocation unit 212.

The double-page spread allocation unit 212 divides the image group and allocates a part of the image group to each double-page spread. Here, an explanation is given by using a double-page spread, but a page may be used. The double-page spread allocation unit 212 divides the image group in accordance with the input number of double-page spreads and allocates a part of the image group to each double-page spread. For example, in a case when the number of double-page spreads is "five", the double-page spread allocation unit 212 divides the acquired image group into five groups to generate five sub image groups and allocates one sub image group to each double-page spread.

An image selection unit 213 selects images that are laid out actually on a double-page spread based on the score given by the image scoring unit 210 from the sub image group allocated to each double-page spread by the double-page spread allocation unit 212.

A template setting unit 214 reads a plurality of templates in accordance with template information specified by the album creation condition specification unit 201 and provides the plurality of templates to an image layout unit 215.

The image layout unit 215 performs image layout processing for each double-page spread. Specifically, for a processing-target double-page spread, the image layout unit 215 determines a template suitable to the images selected by the image selection unit 213 from the plurality of templates input by the template setting unit 214 and determines the layout of each image. Image layout processing for a template having a background slot, to be explained later in detail, is also performed by the image layout unit 215.

A layout information output unit 218 outputs layout information to be displayed on the display 105 in accordance with the image layout determined by the image layout unit 215. The layout information is, for example, bitmap data obtained by laying out the selected images on the determined template.

An image correction condition input unit 216 provides ON/OFF information on image correction specified by the album creation condition specification unit 201 to an image correction unit 217. As the kind of correction, mention is made of, for example, dodging correction, red-eye correction, contrast correction, and so on. It may also be possible to specify ON or OFF of image correction for each kind of correction or to specify for all the kinds of correction en bloc.

The image correction unit 217 performs correction for the layout information held by the layout information output unit 218 based on the image correction condition received from the image correction condition input unit 216.

It is possible to change the number of pixels of the image to be processed in the units from the image conversion unit 206 to the image correction unit 217 in accordance with the size of the layout image determined by the image layout unit 215. In the present embodiment, after the layout image is generated, the image correction is performed for each image, but this is not limited and it may also be possible to perform the correction of each image before laying out the image on a double-page spread page.

In a case when the album creation application according to the present embodiment is installed in the image processing apparatus 100, a boot icon is displayed on the top screen (desktop) of the OS (Operating System) that runs on the image processing apparatus 100. In a case when a user double-clicks the boot icon on the desktop displayed on the display 105 with the mouse 107, the program of the album creation application saved in the HDD 104 is loaded onto the RAM 103. The program on the RAM 103 is executed by the CPU 101 and the album creation application boots.

Figure 3:
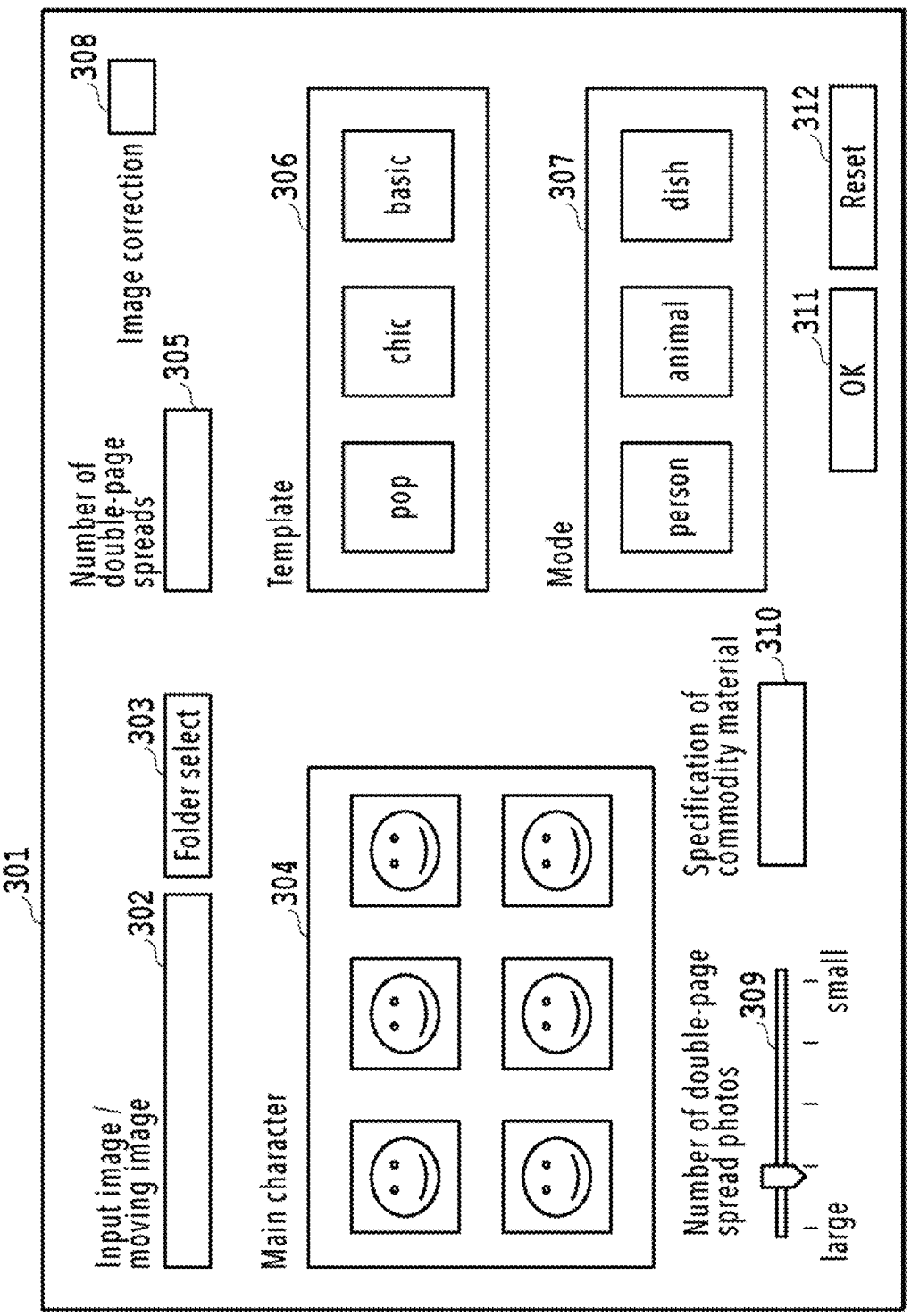
FIG. 3 is a display screen at the time of the album creation application being booted.

FIG. 3 is a display screen 301 provided by the album creation application having booted and the display screen 301 is displayed on the display 105 at the time of the album creation application being booted. It is possible for a user to set album creation conditions via the display screen 301.

On the display screen 301, a path box 302 and a Folder select button 303 are used for specifying an image or a moving image group to be included in an album. The path box 302 displays a saving location (path) in the HDD 104 of an album creation-target image/moving image group. The Folder select button 303 is a button for selecting a folder including the album creation-target image/moving image group from a tree configuration that is displayed. In a case when a user clicks the Folder select button 303 with the mouse 107 and selects the folder including the album creation-target image/moving image group from the tree configuration that is displayed, the path of the selected folder including the album creation-target image/moving image group is displayed in the path box 302.

In a Main character specification part 304, a plurality of face images of persons is displayed as icons. It is possible for a user to specify a main character by clicking (selecting) an icon. The icon of one face image is prepared for one person and each face image is managed in association with the personal ID. The Main character specification part 304 is used for specifying a main character, who is a main person, of the persons captured in an analysis-target image, that is, a photo. The face image is detected in advance from images and registered in a face database in association with the personal ID.

A Number of double-page spreads box 305 is a box for specifying the number of double-page spreads in an album. It is possible for a user to directly input a figure (figures) to the Number of double-page spreads box 305 by using the keyboard 106 or to input a figure (figures) to the Number of double-page spreads box 305 from a list by using the mouse 107.

A Template specification part 306 is also a box for specifying a taste (pop taste, chic taste, and so on) of the template. In the present embodiment, the template is a raw material having arrangement frames (slots) for laying out images in an album and designed with a variety of tastes. In the Template specification part 306, a plurality of illustration images each indicating a taste is displayed as icons and it is possible for a user to select a template by clicking a desired icon with the mouse 107.

A Mode specification part 307 is a box for specifying an object that is taken into consideration at the time of creation of an album. The object is a theme at the time of creation of an album. Here, it is assumed that three objects, that is, "person", "animal", and "dish" can be selected. It is possible for a user to select a mode by clicking the icon of a target object with the mouse 107.

The kinds of object are not limited to those three. It may also be possible to select an object from three or more objects including an object other than those objects and it may also be possible to enable a user to select a plurality of objects at the same time.

A checkbox 308 is a box for specifying ON/OFF of image correction. In a case a user checks the check box 308 with the mouse 107, the above-described image correction becomes ON and, in a case when a user does not check the check box 308, the image correction becomes OFF. In the present embodiment, it is assumed that all the image correction is set to ON/OFF by one button, but this is not limited and it may also be possible to provide a check box for each kind of image correction.

Number of double-page spread photos 309 is for setting the number of images to be arranged on each double-page spread of an album by a slider bar. It is possible for a user to adjust the number of images to be arranged on each double-page spread by moving the slider bar to the left or right.

In a Commodity material specification part 310, a commodity material of an album to be created is set. As the commodity material, it is possible to set the size of an album and the kind of sheet of an album. It may also be possible to individually set the kind of front cover and the kind of binding portion.

An OK button 311 is a button to determine conditions selected on the display screen 301 as the album creation conditions. In a case when a user clicks (selects) the OK button 311 with the mouse 107, the album creation conditions are settled and the album creation conditions are transmitted to the automatic layout processing unit 219 via the album creation condition specification unit 201. On the other hand, a Reset button 312 is a button for resetting each piece of setting information on the display screen.

Each piece of information set on the display screen 301 shown in FIG. 3 is provided to the automatic layout processing unit in FIG. 2. Specifically, the path information input to the path box 302 is provided to the image acquisition unit 205. The personal ID of the main character specified in the Main character specification part 304 is provided to the main character information input unit 209. The number of double-page spreads specified in the Number of double-page spreads box 305 is provided to the number of double-page spreads input unit 211. The template information selected in the Template specification part 306 is provided to the template setting unit 214. The ON/OFF information on the image correction in the Image correction checkbox is provided to the image correction condition input unit 216.

Figure 4B:
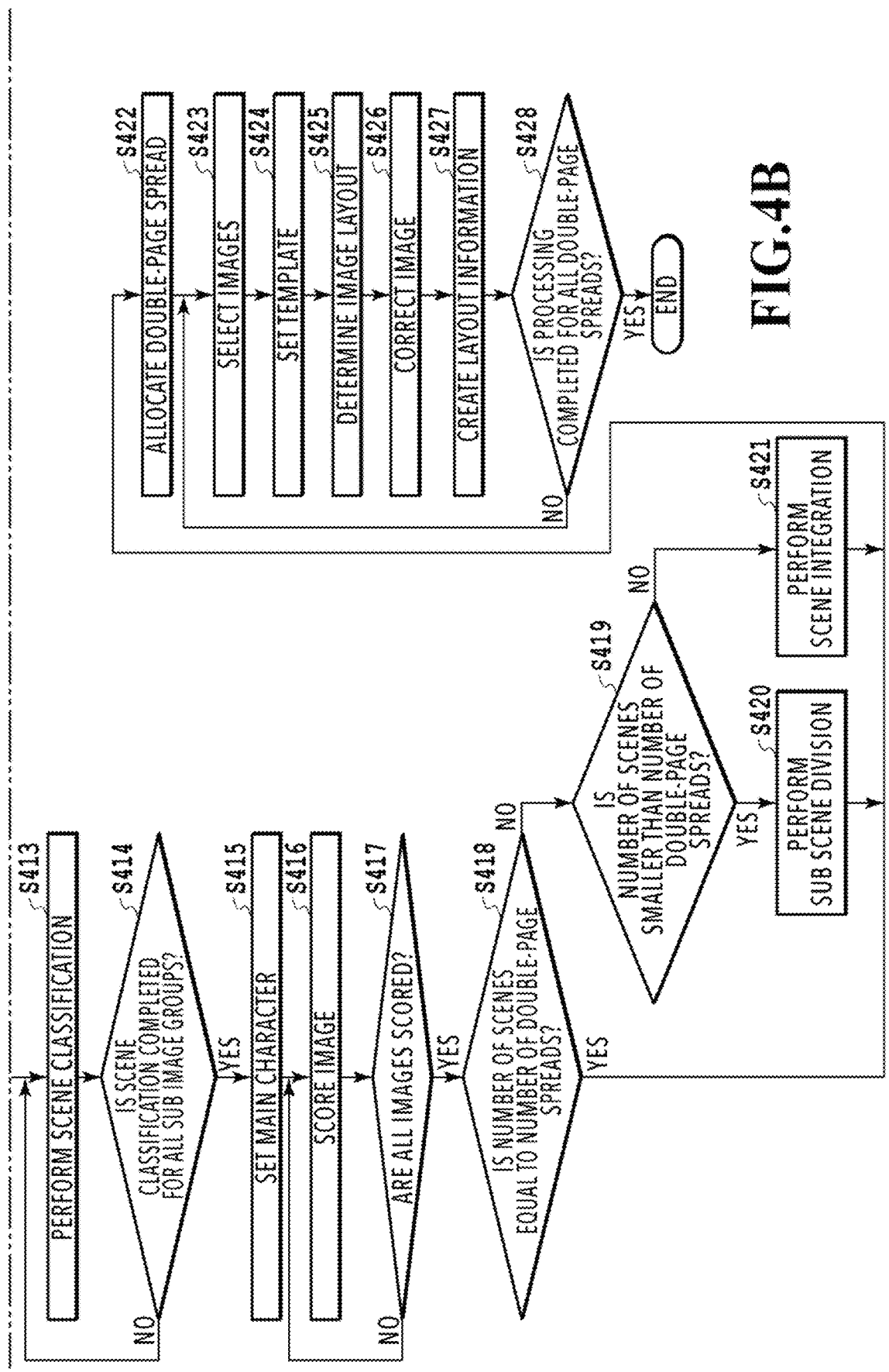
FIG. 4B is a flowchart for explaining an automatic layout method.

FIG. 4A and FIG. 4B are flowcharts for explaining an automatic layout method in the album creation application according to the present embodiment. This flowchart is implemented by, for example, the CPU 101 reading a program stored in the HDD 104 onto the ROM 102 or the RAM 103 and executing the program. In terms of software, this flowchart is processing that the CPU 101 performs via each block in FIG. 2. In the following, with reference to FIG. 2, each step of the flowchart in FIG. 4A and FIG. 4B is explained in order.

In a case when this processing is started, first, at S401, the album creation condition specification unit 201 sets album creation conditions. Specifically, the album creation condition specification unit 201 sets the information that is set relating to the image data of the moving image or the image group used for creating an album, the main character, the number of double-page spreads, the template, the mode, and the image correction.

At S402, the moving image acquisition unit 202 acquires moving image data.

At S403, the moving image analysis unit 203 analyzes the moving image data acquired at S402 and calculates a score obtained by combining the results of the amount of movement, the camera work, the shake/blur, the expression, and so on. Then, the moving image analysis unit 203 sets moving image data whose calculated score value is larger than or equal to a predetermined threshold value as a layout candidate. At this time, it may also be possible to set moving image data whose calculated score value is less than the predetermined threshold value as an editing candidate that can be replaced with moving image data for a layout candidate at the time of the editing work of a user.

At S404, the frame acquisition unit 204 cuts out a frame from the analyzed moving image and saves the frame in the HDD 104 as image data. Further, the frame acquisition unit 204 saves the analysis results (amount of movement, camera work, score) corresponding to the saved frame in the HDD 104 in association with the frame.

At S405, whether or not the processing at S402 to S404 has been completed for all the moving images of the moving image group of the HDD 104 specified by the album creation condition specification unit 201 is determined. In a case when the processing has not been completed yet (No at S405), the processing returns to S402. In a case when the processing has been completed (Yes at S405), the processing advances to S406.

At S406, the image acquisition unit 205 read an image included in the image group specified at S401 from the HDD 104 and develops the image in the RAM area 103.

At S407, the image conversion unit 206 converts the image acquired at S406 into a format that can be analyzed by the image analysis unit 207. Specifically, the image conversion unit 206 subjects each piece of image data of the image group acquired at S406 to resolution conversion so that the number of pixels of a short side is 420, and to color conversion so that each pixel is represented by sRGB standard color information.

At S408, the image analysis unit 207 analyzes the image converted at S407 and acquires a feature quantity. As the feature quantity of an image, for example, mention is made of a focus. It is possible to determine a focus by an average inclination of an edge in an image. By detecting an edge in an image by a publicly known Sobel filter and by dividing a difference in luminance between the start point and the endpoint of the edge by the distance between the start point and the endpoint, the inclination of the edge, that is, a luminance gradient is calculated. Then, by calculating the average inclination of the edge in the image, it is possible to determine that an image whose average inclination is large is more in focus than an image whose average inclination is small. In the present embodiment, a plurality of inclination threshold values is set and by determining whether the average inclination is larger than or equal to which of the inclination threshold values, whether the in-focus degree is acceptable is determined. In the present embodiment, two different inclination threshold values are set and the in-focus degree is determined to be one of three levels, that is, ○, Δ, and x. In a case when the average inclination of the edge in the image is larger than or equal to a first threshold value, the inclination of the focus is set to ○ (preferable), in a case when the average inclination is larger than or equal to a second threshold value, smaller than the first threshold value, the inclination of the focus is set to Δ (acceptable), and, in a case when the average inclination is less than the second threshold value, the inclination of the focus is set to x (unacceptable). The image analysis unit 207 also acquires the date of image capturing from information attached to each piece of image data. In the present embodiment, the date of image capturing is acquired from Exif information attached to each piece of image data.

At S409, the image analysis unit 207 performs object detection and recognition in each piece of image data. Specifically, for example, a face is detected from the image data generated at S407. For detection of a face, it is possible to use a publicly known method, for example, to make use of Adaboost that creates a strong classifier from a plurality of prepared weak classifiers.

At S409, the image analysis unit 207 acquires the top-left coordinate values and the bottom-right coordinate values of the position of the detected face image in the image as well as detecting (extracting) the face image. The "image" referred to here is an image represented by the image data generated at S407. By specifying the two kinds of coordinate, it is possible to specify the position of the face and the size of the face of a person. Further, by simultaneously performing AdaBoost that detects an animal, such as a dog and a cat, and a dish, respectively, as in the case with a face, it is possible to detect an object of a person, an animal, or a dish and, at the same time, to classify what the object is. The above is not limited and the object may be a flower, a building, an ornament, and so on. Here, an explanation is given by the object classification using AdaBoost, but it may also be possible to use image recognition by DeepNeuralNetwork.

At S410, the image analysis unit 207 performs personal recognition. First, the image analysis unit 207 compares the face image extracted at S409 with the representative face image saved for each personal ID in a face dictionary database as to similarity. Then, the personal ID whose similarity is higher than or equal to a threshold value and whose similarity is the highest is determined as the ID of the extracted face image. That is, the person corresponding to the personal ID whose similarity is higher than or equal to the predetermined threshold value and whose similarity is the highest is specified as the person of the extracted face image. In a case when the similarity is less than the threshold value, a new personal ID is allocated to the extracted face image as a new person and the face image is registered to the face dictionary database.

The image analysis unit 207 stores the image analysis information of each piece of image data acquired at each step from S408 to S410 in the HDD 104 by distinguishing each ID for identifying an image from another.

FIG. 5 is a diagram showing an example of image analysis information of each piece of image data stored in the HDD 104. The date of image capturing information and the focus determination results acquired at S408, the number of faces and the position information detected at S409 are saved as image analysis information of each piece of image data in association with the image ID. There is a case when a plurality of faces is included in one piece of image data and the position information on a face is stored by distinguishing for each personal ID acquired at S410. Further, in a case when no face is detected in the image data, only the date of image capturing information and the focus determination results acquired S408 are saved, and the position information on a face is not saved.

In the object classification, main objects included within the image are saved from the main object whose reliability at the time of execution of Adaboost is high in order of TOP1, TOP2, TOP3, . . . . This is the same in a case of an object other than the face. AdaBoost forms one strong classifier by successively connecting weak classifiers determining a pattern. Because of this, reliability becomes high in a case when the number of weak classifiers coinciding with a pattern learned in advance by Adaboost is large. Here, the object determination is explained by taking AdaBoost as an example, but the classifier may be a classifier using ConvolutionalNeuralNetwork, represented by DeepNeuralNetwork.

Returning to FIGS. 4A and 4B, at S411, the whether or not S407 to S410 have been completed for all the images of the image group of the HDD 104 specified by the album creation condition specification unit 201. In a case when S407 to S410 have not been completed yet (No at S411), the processing returns to S406. In a case when S407 to S410 have been completed (Yes at S411), the processing advances to S412.

At S412, the image classification unit 208 performs scene division. The scene division refers to dividing the acquired image group into a plurality of sub image groups in accordance with a scene. Specifically, based on the date of image capturing information already acquired at S408, the image group is divided into a plurality of sub image groups based on the time difference between images. An example of criteria of division is explained in the following.

In the image group, for example, attention is focused first on an image (image of interest) whose date of image capturing is the oldest (or the newest) and the time difference from the second oldest (or newest) image is referenced. This is performed while sequentially replacing the image of interest with an image whose date of image capturing is next newer (or older) and to which one of the following conditions the time difference corresponds is determined. Division to be explained in the following means grouping of the image group into a group whose date of image capturing is new and a group whose date of image capturing is old by taking a boundary between two images.

In a case when the dates of image capturing of images are not consecutive, that is, a day on which image capturing is not performed exists between images, division is performed. In a case when dates of image capturing are consecutive, in the present embodiment, on a condition that the difference between the dates of image capturing of images is sixteen hours or more, division is performed. In a case when the difference between the dates of image capturing of images is less than sixteen hours, on a condition that the time difference between the first image capturing and the last image capturing of each of the consecutive days is less than four hours, division is performed. In the preset embodiment, in a case when the time difference is four hours or more, on a condition that the number of captured images of each of the consecutive days is less than fifty, division is performed and division is not performed in a case when the number of captured images is fifty or more. The threshold value of the time difference and the threshold value of the number of images at the time of division are not limited to those.

Figure 6A:
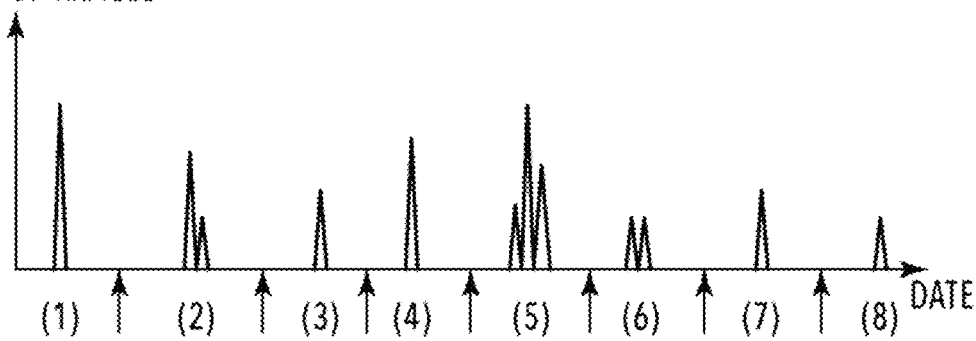
FIG. 6A to FIG. 6C are diagrams showing division and integration of sub image groups.

FIG. 6A shows results of performing division by the scene division method described above. The horizontal axis represents the date (image capturing time) and the vertical axis represents the number of images corresponding to each date. The portion indicated by an arrow indicates the position at which division is performed by the above-described method the image group included between two arrows is a sub image group belonging to the same scene. Here, eight sub image groups (1) to (8) are generated.

Returning to FIGS. 4A and 4B, at S413, the image classification unit 208 performs scene classification. In the present embodiment, the scene classification means the work to classify each sub image group into the kinds of scene, such as "journey", "daily life", and "ceremony". In the following, for simplification, an explanation is given by taking a case, as an example, when the scene is classified into three kinds of scene, that is, "journey", "daily life", and "ceremony", but the kinds of scene are not limited to those.

First, the image classification unit 208 acquires a plurality of sub image groups determined in advance to be classified into one of journey, daily life, and ceremony. Next, feature quantities of image capturing are acquired for the sub image group. Here, the feature quantities are numerical values obtained based on the quantities, such as the image capturing period, the number of captured images, and the number of captured persons. The image capturing period is the time difference between the first image capturing and the last image capturing of the image group. The number of captured images is the number of images (number of photos) included in the sub image group. The number of captured persons is the number of faces in an image in which faces are captured, that is, the number of faces included in one image. Then, for the plurality of sub image groups, the average value and the standard deviation of the image capturing period, the average value and the standard deviation of the number of captured images, and the average value and the standard deviation of the number of persons per image are found. In the present embodiment, it is assumed that the number of persons per image is the number of faces per image.

The acquisition work of each average value and standard deviation of the image capturing period, the number of captured images, and the number of captured persons is included in advance in the album creation application program. That is, in a case when the album creation application is booted, the CPU 101 performs scene division of the image group specified by a user in the path box 302 and generates sub image groups, and calculates the average value of each of the image capturing period, the number of captured images, and the number of captured persons for each sub image group.

FIG. 7 shows an example of each average value and standard deviation of the image capturing period, the number of captured images, and the number of captured persons.

Next, the CPU 101 performs a scoring work for each sub image group based the average value and the standard deviation of each feature quantity. Specifically, by using expressions below, scores are calculated.

score for each scene and feature quantity=50−|10× (average value for each scene and feature quantity−feature quantity for each sub image group)/ standard deviation for each scene and feature quantity|     (expression 1)

average score for each scene=(score of image capturing period for each scene+score of number of captured images for each scene+score of number of captured persons for each scene)/ number of feature quantity items     (expression 2)

By expression (1), scores for each scene and each feature quantity of the sub image group of interest are found. For example, scores of each of the image capturing period, the number of captured images, and the number of captured persons of the "journey" scene are found. These scores are averaged by expression (2) and taken to be a score relating to the "journey" scene. Similarly, scores are obtained for the other scenes, "daily life" and "ceremony". By the above, average scores for each of journey, daily life, and ceremony are calculated. For each sub image group, the scene having the highest score is classified as the scene of the sub image group. In a case when two or more scenes have the same score, the scene is classified in accordance with priority of a scene. For example, in the present embodiment, it is determined in advance that priority is in order of daily life, ceremony, and journey and the highest priority is given to daily life. The order of priority is not limited to this and it may also be possible to enable a user to set the order of priority.

For example, for the sub image group (5) after the scene division in FIG. 6A, the image capturing period is thirty-six hours, the number of captured images is three hundred, and the number of captured persons is 1.7. The average score of "journey" is 45.32, the average score of "daily life" is 18.38, and the average score of "ceremony" is −29.92, and the scene of the sub image group (5) is classified as "journey". The sub image group is managed in association with a scene ID so that it is possible to identify a scene.

Returning to FIG. 4A and FIG. 4B again, at S414, the image classification unit 208 determines whether or not the scene classification has been completed for all the sub image groups divided at S412. In a case when the scene classification has not been completed yet (No at S414), the processing returns to S413. In a case when the scene classification has been completed (Yes at S414), the processing advances to S415.

At S415, the main character information input unit 209 performs main character setting. The main character setting is performed for an image group specified by a user and includes two kinds of setting, that is, automatic setting and manual setting. In a case when a main character is set by the automatic setting, the main character information input unit 209 sets a main character based on the results of the personal recognition at S410 and the results of the scene division at S412. Specifically, the main character information input unit 209 specifies the number of times each personal ID appears in the sub image group, the number of times of each personal ID appears in each scene, the number of scenes in which each personal ID appears, and so on, from the results acquired at S410 and sets a main character based on the information. In the present embodiment, in a case when there is a plurality of scenes in the sub image group, the personal ID appearing in a plurality of scenes is set as a main character ID and, in a case when the sub image group is a single scene, the personal ID whose number of times of appearance in the single scene is large is set as a main character ID. In a case when a user specifies a specific icon, the CPU 101 notifies the image scoring unit 210 of the personal ID corresponding to the icon selected via the main character information input unit 209. In a case when there is a personal ID specified by a user, the main character ID of the automatic setting described above is ignored and the personal ID specified by a user is set as the main character ID. The setting based on the specification of the main character specification unit 304 as described above is referred to as a manual setting.

At S416, the image scoring unit 210 performs scoring of an image. The score referred to here is a numerical value that is referred to at the time of image selection, to be described later, and is acquired for each piece of image data. For the image cut out from a moving image, scoring is performed by also adding the results analyzed by the image analysis unit 203. In the following, by using FIG. 8A, FIG. 8B, and FIG. 10, a scoring method is explained.

Figure 10:
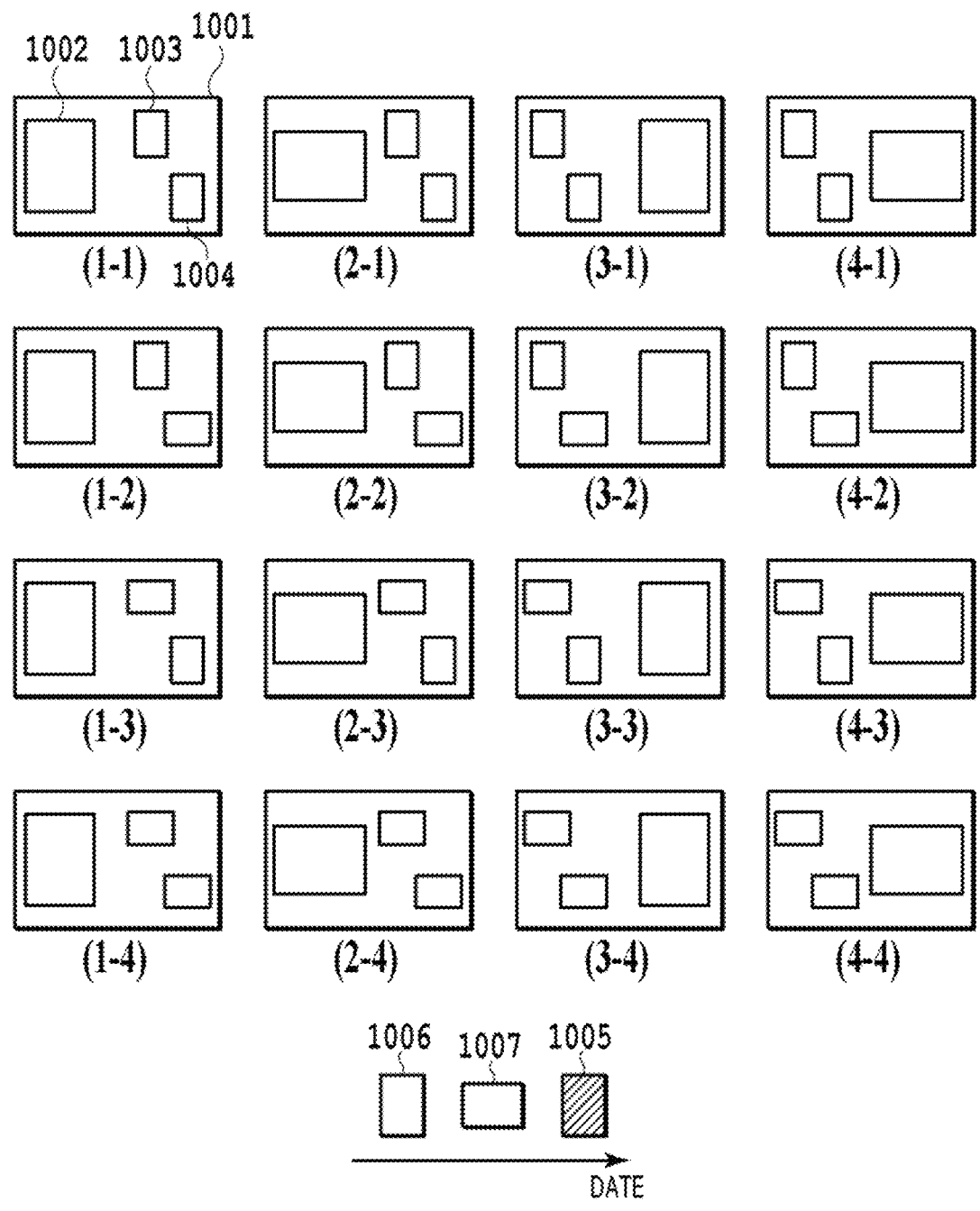
FIG. 10 is a diagram showing a template group at the time of laying out three images.

FIG. 10 shows a template group used at the time of laying out three images. A template 1001 shown in (1-1) in FIG. 10 is one template and has a main slot 1002, a sub slot 1003, and a sub slot 1004. The main slot 1002 is a slot (frame in which an image is laid out) that is the main slot in the template 1001 and whose size is larger than those of the sub slot 1003 and the sub slot 1004. That is, the main slot is a slot whose size is the largest in each template. Further, the sub slot is a slot other than the main slot in each template. Both a score for the main slot and a score for the sub slot are attached to each piece of image data.

FIG. 8A is a diagram showing criteria of scoring of image data for the main slot and the sub slot. More specifically, FIG. 8A is a table that puts together the features of images that increase the score for each scene of journey, daily life, and ceremony. The feature that increases the score is different depending on the kind of slot. For example, in a case when the scene classification of the sub image group is "journey", the score of a zoomed-out image in which a person and a scenery are included is high and the score of an image of a zoomed-in face or a face in profile is high as the sub slot. Further, in a case when the scene classification of the sub image group is "daily life", the score of an image of a zoomed-in face or a face in profile is high as the main slot and a zoomed-out image in which a person and a scenery are included is high as the sub slot. Furthermore, in a case when the scene classification of the sub image group is "ceremony", the score of an image in which the distance between two persons is small is high as the main slot and the score of an image in which a large number of persons are included is high as the sub slot. As described above, the feature that increases the score, in other words, the evaluation criteria are different depending on the kind of scene and the kind of slot. In the present embodiment, it is assumed that the features that increase the score in accordance with the kinds of scene and slot are set in advance in the application and included in the program. The features that increase the score are not limited to those described above.

The image scoring unit 210 scores each piece of image data included in each sub image group based on the features of the main slot and the sub slot of each scene shown in FIG. 8A. The number of faces in each image, the position of a face in each image, and the size of a face in each image are acquired, and the average value and the standard deviation are found for each kind of scene and each kind of slot (main slot and sub slot) and stored in advance in the program of the album creation application. To which scene the image represented by each piece of image data of the image group specified by a use belongs (is classified) is specified by the results of the scene classification at S413. Then, based on the average value and the standard deviation found in advance corresponding to the scene of the image of interest, and each feature quantity of the number of faces, the face position, and the face size of the main character ID in the image of interest, the score and the average score are obtained by using expressions below. In the following expressions, the score, the average value, and the standard deviation are found for each of the scene classification, the kind of slot, and the feature quantity.

score=50−|10×(average value−feature quantity)/standard deviation| average score=(score of number of faces+score of face position+score of face size)/number of feature quantity items Further, the CPU 101 adds a score to above-described calculated score based on the mode specified by the album creation condition specification unit 201. In a case when a person is set in the mode, on a condition that an image whose category is a person is included in TOP1 to TOP3 by the object classification stored in the image analysis information in FIG. 5, a score is added. The higher the reliability of the object classification results, the higher the score that is added is made. In addition, it may also be possible to change the score that is added in accordance with the order of the object classification results. Here, for explanation, the case is explained where a person is selected in the mode, but another mode, such as animal and dish, may be accepted. Further, the number of modes to be selected is not limited to one and it may also be possible to select two or more modes. In such a case, a score corresponding to an amount corresponding to the included selected objects is added.

Scoring is performed for both the main slot and the sub slot. As an image used for an album, it may also be possible to add a score for the image of the image ID whose feature quantity of focus shown in FIG. 5 is ∘. Due to this, it is possible to increase the score of an image in focus. FIG. 8B shows an example of scoring results of each image and for each image ID, scoring is performed for the main slot and the sub slot.

After the scores are set to the main and sub slots for an image, in a case when the kind of image shown in FIG. 5 is a moving image, the score value analyzed and calculated by the moving image analysis unit 203 is added to both the scores of the main and sub slots. Here, the method that makes use of the score value calculated by the moving image analysis unit 203 is described, but it may also be possible to increase the score value to be added in accordance with the amount of movement. Alternatively, it may also be possible to add a predetermined score value to the frame after zooming by the camera work or the fame after panning. By doing so, it is possible to reflect the intention of a user at the time of image capturing of a moving image. However, only by adding the score at the time of image capturing of a moving image, there is a case when an image cut out from a moving image is more advantageous than a still image. In such a case, it may also be possible to calculate the average value of the score value of each cutout image calculated by the moving image analysis unit 203 and to add the average value to the scores of all the still images or to subtract the average value from the score of the cutout image.

Returning to FIG. 4A and FIG. 4B again, at S417, the CPU 101 determines whether or not the image scoring unit 210 has completed the image scoring at S416 for all the images of the image group specified by a user. In a case when the image scoring has not been completed yet (No at S417), the processing returns to S416. In a case when the image scoring has been completed (Yes at S417), the processing advances to S418.

At S418, the double-page spread allocation unit 212 determines whether or not the number of sub image groups obtained by the scene division at S412 is the same as the number of double-page spreads specified at S401. In a case when the numbers are not the same (No at S418), the processing advances to S419. In a case when the numbers are the same (Yes at S418), the processing advances to S422. For example, in a case when the number of scene divisions in FIG. 6A is eight and the input number of the number of double-page spreads input unit 211 is eight, the processing advances to S422.

At S419, the double-page spread allocation unit 212 determines whether or not the number of scenes obtained by the scene division of the image classification unit 208 is smaller than the number of double-page spreads input from the number of double-page spreads input unit 211. In a case when the number of scenes is not smaller than the number of double-page spreads (No at S419, the processing advances to S421. In a case when the number of scenes is smaller than the number of double-page spreads (Yes at S419), the processing advances to S420. For example, as in FIG. 6A, in a case when the number of scene divisions (number of sub image groups) is eight and the input number of the number of double-page spreads input unit 211 is ten, the number of scenes is not smaller than the number of double-page spreads, and therefore, the processing advances to S421.

Figure 6B:
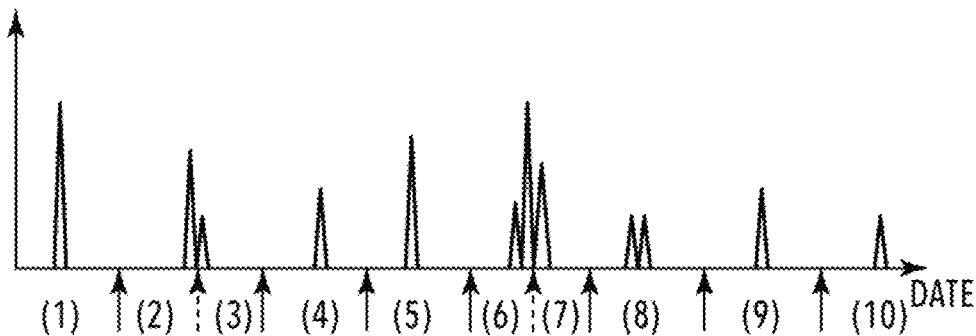

At S420, the double-page spread allocation unit 212 performs sub scene division. The sub scene division refers to further dividing the one or more sub image groups in a case when the number of sub image groups is smaller than the number of double-page spreads. In a case when the specified number of double-page spreads is ten for the number of scene divisions, which is eight, as shown in FIG. 6A, for example, the double-page spread allocation unit 212 divides the sub image group (2) and the sub image group (5) into two sub image groups, respectively, and regenerates ten sub image groups (1) to (10) as shown in FIG. 6B. In FIG. 6B, a broken line arrow indicates the portion (date) at which the sub image group is further divided.

As described above, it may be possible to determine the portion at which the sub image group is further divided by the number of images and the date of image capturing. In the case of FIG. 6A, the number of images included in the sub image group (2) and the sub image group (5) is larger than that in the other sub image groups, and, therefore, these two sub image groups are set as the sub image groups that are further divided. In a case when sub image groups whose number of image is large and the same exist, the scene whose maximum value of the difference in the date of image capturing between images is larger is selected. In the case of FIG. 6A, the number of images of the sub image group (1) and the sub image group (2) is the same, but the time difference between the first image and the last image is larger in the sub image group (2), and, therefore, the sub image group (2) is divided. In a case when the number of images and the maximum value of the difference in the date of image capturing between images are the same, for example, it may also be possible to appropriately determine in advance, such as that the scene that is earlier in terms of time is re-divided preferentially.

Next, the division portion in each sub image group is explained. In the sub image group (2), there are two peaks of the number of images and the dates of image capturing of the two peaks are different. Consequently, the sub image group (2) is divided at the portion at which the date of image capturing changes (portion of the broken line arrow in FIG. 6B). In the sub image group (5), there are three peaks of the number of images and the dates of image capturing of the three peaks are different. In this case, the division portion is determined so that the difference in the number of images between divided image groups becomes small. That is, in a case when the sub image group (5) is divided at the boundary between the second day and the third day, the difference in the number of images between divided image groups becomes smaller than that in a case when the sub image group (5) is divided at the boundary between the first day and the second day, and, therefore, the sub image group (5) is divided at the boundary between the second day and the third day (portion of the broken line arrow). By dividing the sub image group (2) and the sub image group (5), respectively, into two sub image groups as above, the ten sub image groups (1) to (10) as shown in FIG. 6B are generated. Here, the division is performed at the portion at which the date of image capturing changes, but, in a case when a sub image group whose number of images is large is captured in a single day, the division is performed at the portion at which the time difference in the single day is the largest.

Referring to FIG. 4A and FIG. 4B again, at S421, the double-page spread allocation unit 212 performs scene integration. The scene integration is the work to integrate divided scenes (sub image groups) in a case when the number of scenes (number of sub image groups) is larger than the number of double-page spreads so that the number of scenes and the number of double-page spread coincide with each other.

Figure 6C:
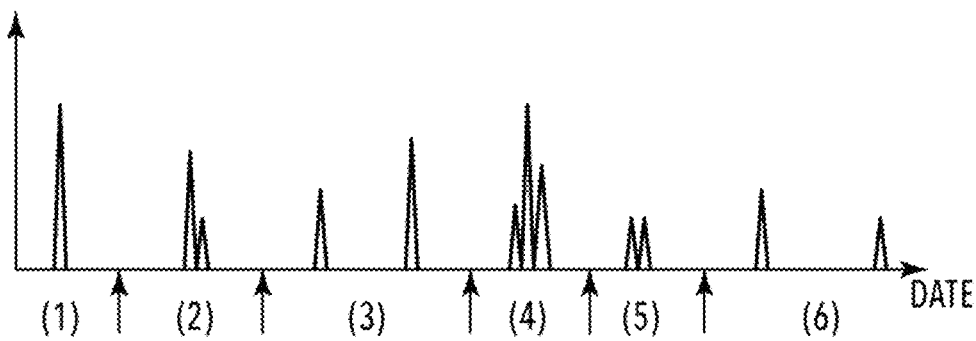

In a case when the number of double-page spreads is six for the number of scene divisions, which is eight, as shown in FIG. 6A, the double-page spread allocation unit 212 integrates, for example, the sub image group (3) and the sub image group (4), and further integrates the sub image group (7) and the sub image group (8). Due to this, six sub image groups (1) to (6) as shown in FIG. 6C are regenerated. In FIG. 6C, the broken line indicates the portion (date) at which the sub image groups are integrated.

In the scene integration, the sub image group whose number of image is smaller is specified and this is integrated with the adjacent sub image group. In the case of FIG. 6A, the number of images is small in order of the sub image group (8), the sub image group (3), and the sub image group (7), and, therefore, first, the sub image group (8) and the sub image group (7) adjacent thereto are integrated. Next, with which of the sub image group whose date of image capturing is earlier and the sub image group, whose date of image capturing is later the sub image group (3) is integrated, is determined. Specifically, the time difference between the sub image group (3) and the sub image group (2) is compared with the time difference between the sub image group (3) and the sub image group (4) and the integration is performed for the combination whose time difference is smaller. In the case of this example, the time difference between the sub image group (3) and the sub image group (4) is smaller than the time difference between the sub image group (3) and the sub image group (2). Consequently, the sub image group (3) is integrated with the sub image group (4). By integrating the sub image group (7) and the sub image group (8), and the sub image group (3) and the sub image group (4) as above, the six sub image groups (1) to (6) as shown in FIG. 6C are generated. In the present embodiment, the sub image groups whose time difference is smaller are integrated, but the integration is not limited to this. For example, it may also be possible to integrate the integration-target sub image group with a sub image group whose number of captured images is small.

Returning to FIG. 4A and FIG. 4B again, at S422, the double-page spread allocation unit 212 performs double-page spread allocation. By S418 to S421, the number of sub image groups and the specified number of double-page spreads have become the same. In the present embodiment, the sub image group whose date of image capturing is the earliest is allocated to the top double-page spread. That is, the sub image groups are allocated to each double-page spread in order of the date of image capturing. Due to this, it is possible to create an album in which the sub image groups are arranged in order of the date of image capturing. Within one double-page spread, it is not necessary for images to be arranged in order of the date of image capturing.

At S423, the image selection unit 213 selects a predetermined number of images from each sub image group.

FIG. 9A to FIG. 9F are diagrams showing an example in which four images are selected from the sub image group allocated to a certain double-page spread. In each diagram, the time difference in the date of image capturing between the first image and the last image included in the sub image group allocated to the double-page spread, in other words, the image capturing period of the sub image group is represented by the horizontal axis.

In the present embodiment, first, the image whose score acquired at S416 is the highest is set as the image for the main slot. In FIG. 9B, the date of image capturing of the image selected for the main slot is indicated by arrow 1 on the time axis.

Here, in the present embodiment, the images displayed on the same double-page spread are arranged so that the dates of image capturing are as dispersed as possible within the period (from Start to End). Because of this, the entire period is equally divided into two periods as shown in FIG. 9C and the image whose score is the highest is selected as the image for the sub slot, which is selected next, from a plurality of images included in the period different from that in which arrow 1 is included. FIG. 9D shows the state where the date of image capturing of the image selected first for the sub slot is added to FIG. 9C as arrow 2.

FIG. 9E shows the state where the two equally divide periods are further equally divided into two periods, that is, the entire section is equally divided into four sections. Then, the second image for the sub slot is selected from a section in which neither main slot nor sub slot is set of the four sections. That is, the image whose score is the highest in the two sections in which neither main slot nor sub slot is set of the four sections is selected and is set as the second image for the sub slot. FIG. 9F shows the state where the date of image capturing of the image for the sub slot selected second is added to FIG. 9E as arrow 3.

As the third image for the sub slot, it may also be possible to select the image whose score is the highest in the remaining section in which neither main slot nor sub slot is set of the four sections. However, it cannot be said that an image always exists in the remaining section, that is, in the section indicated by slashes in FIG. 9G and there is a case when no image exists in the section in question. In this case, each section is further equally divided into two sections as in FIG. 9H and the image whose score is the highest in the remaining sections in which neither main slot nor sub slot is set is selected of the eight equally divided sections. FIG. 9I shows the state where the date of image capturing of the third image for the sub slot thus selected is added as arrow 4.

Figure 11:
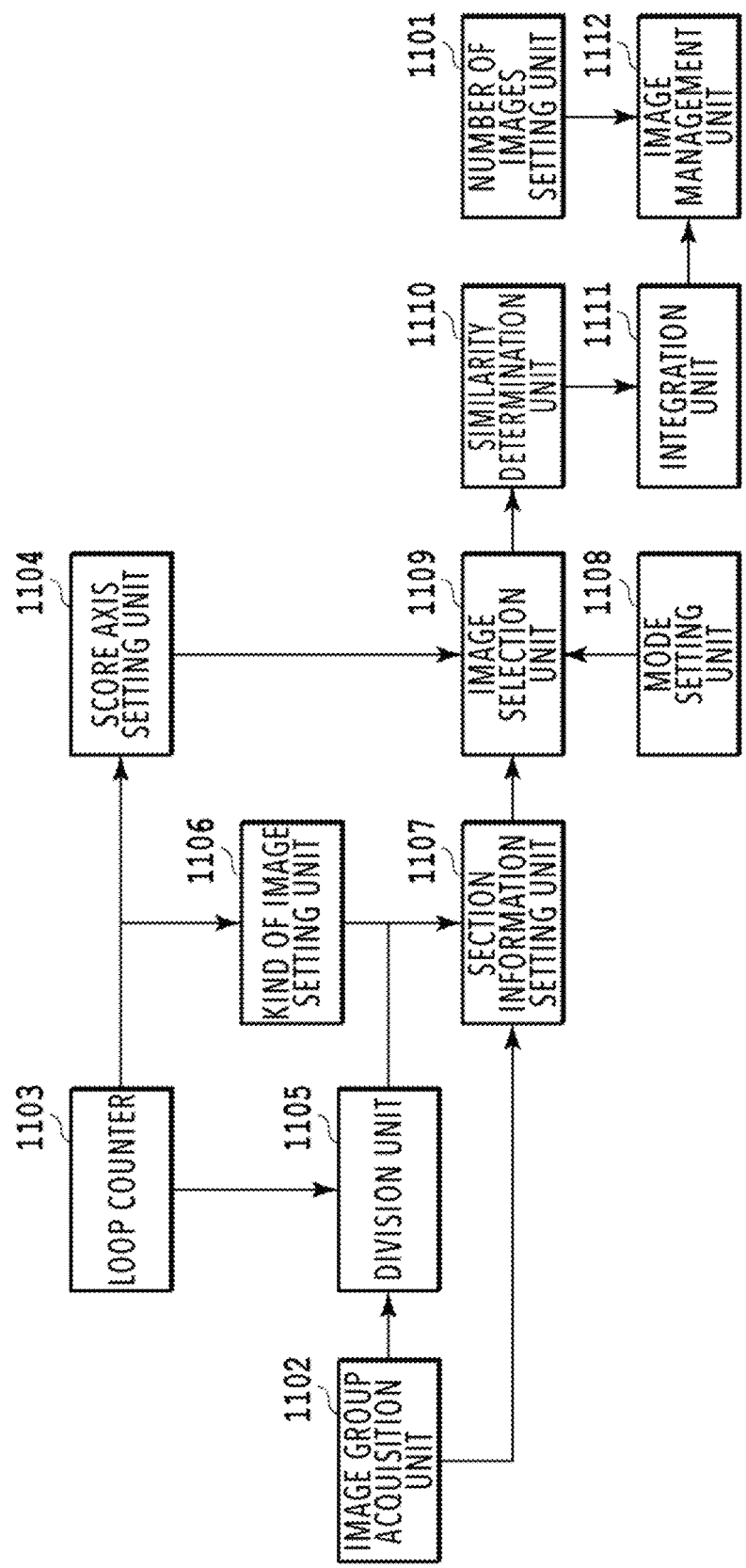
FIG. 11 is a software block diagram for implementing image selection.

FIG. 11 is a software block diagram for implementing the selection as described above at S423. This block diagram is a diagram that shows the image selection unit 213 shown in FIG. 2 already explained in more detail.

A number of images setting unit 1101 sets the total number of images to be displayed actually on the double-page spread from the sub image group allocated to the processing-target double-page spread.

An image group acquisition unit 1102 acquires the sub image group allocated to the double-page spread from the image group acquired by the image acquisition unit 205 in FIG. 2. At this time, the image group acquisition unit 1102 also acquires the date of image capturing information, the kind of image, the object information, the score for the main slot, and the score for the sub slot in association with each image. In the present embodiment, the kind of image is classified into three images, that is, a still image, a moving image cutout image, and an SNS image, but the kind of image is not limited to those. It may also be possible to classify the kind of image into one different from the above-described three kinds of image, or it may also be possible to further classify a still image into, for example, a still image captured by a digital camera and a still image captured by a smart device.

A loop counter 1103 manages the number of times an image is selected as explained in FIG. 9. The managed number of times is made use of at the time of determining a score axis, to be described later, setting the number of image capturing sections into which the image capturing period of the sub image group allocated to the processing-target double-page spread is divided, and so on.

A score axis setting unit 1104 sets a score axis that is made use of in accordance with the number of times of processing counted by the loop counter 1103. In the present embodiment, each image is scored for each evaluation criterion and "setting a score axis" means "setting an evaluation criterion by which a score is referred to". Here, the main slot score axis (main slot evaluation criterion) and the sub slot score axis (sub slot evaluation criterion) calculated at S416 are prepared and it is possible for the score axis setting unit 1104 to set one of the score axes in a switchable manner.

For example, in a case when the number of times managed by the loop counter 113 is one, the main slot score axis is set and setting is performed so that the processing to select a main image is performed. In a case when the number of times managed by the loop counter 113 is two or more, the sub slot score axis is set and setting is performed so that the processing to select a sub image is performed.

In the present embodiment, an explanation is given by taking the main slot score axis and the sub slot score axis as the score axes that are made use of as an example, but it may also be possible to use another score axis. For example, in addition to the main slot score axis and the sub slot score axis, it may also be possible to use a person-related degree score axis that scores an image based on the number of times of appearance of a person or the number of times of being captured together. By doing so, an image including a person whose number of times of appearance and number of times of being captured together is given a high score and, in a case when the person-related degree score axis is set, it is possible to preferentially select such an image.

Further, in the above, each score axis is switched alternatively, but it may also be possible to prepare a total score axis combining the main slot score axis, the sub slot score axis, the person-related degree score axis, and so on. In this case, it is also possible to prepare a weighting factor for each score axis. Further, it may also be possible to randomly change the score axis in accordance with the number of times of processing, or to switch score axes by referring to a table prepared in advance.

A division unit 1105 performs section management of the image capturing period as explained in FIG. 9. The division unit 1105 specifies the image capturing start time and the image capturing end time of a sub image group allocated to a processing-target double-page spread and calculates the image capturing period (from Start to End in FIG. 9). Then, based on the number of times of selection managed by the loop counter 1103, the division unit 1105 generates a plurality of image capturing sections by equally dividing the calculated image capturing period and outputs the image capturing start time and the image capturing end time of each divided section. In the case of the present embodiment, the number of divisions of the image capturing section corresponds to powers of two based on the number of times of selection, such as two, four, . . . . However, the present invention is not limited to this. For example, it may also be possible to equally divide the image capturing period by the counted number.

A kind of image setting unit 1106 sets the kind of image that should be selected in the next image selection based on the number of times of selection set by the loop counter 1103. For example, the kind of image setting unit 1106 sequentially sets the kind of image so that an image is selected from SNS images the first time, an image is selected from moving image cutout images the second time, and an image is selected from still images the third and subsequent times.

A section information setting unit 1107 divides images included in the sub image group acquired by the image group acquisition unit 1102 into groups for each section divided by the division unit 1105 and stores information on each section along with image capturing information on images, score information on each image, and so on.

A mode setting unit 1108 receives mode information specified by the album creation condition specification unit 201 in FIG. 2 and provides the mode information to an image selection unit 1109.

The image selection unit 1109 selects one image from each section based on the score axis set by the score axis setting unit 1104, the mode set by the mode setting unit 1108, and the score of an image set by the section information setting unit 1107. In more detail, the image selection unit 1109 selects one image whose score is the highest from among images including an object corresponding to the set mode of one or more images included in each section. At this time, for the determination of whether or not each image is an image including an object corresponding to the set mode, it is possible to make use of the object classification explained in FIG. 5. For example, it is possible to determine that an image in which a desired object is included in TOP 1, TOP 2, or TOP 3 of the object classification as an image including the object.

In a case when a section including no image like the area indicated by slashes in FIG. 9 exists, the image selection unit 1109 does not make a selection from the section. Further, in the above, one image is selected from each section, but it may also be possible to select a plurality of images from each section.

A similarity determination unit 1110 performs similarity determination with an already selected image for an image selected for each section. For example, the similarity determination unit 1110 acquires the similarity degree by making use of the publicly known pattern matching or the SHIFT method and, in a case when the similarity degree is higher than or equal to a determination threshold value, the similarity determination unit 1110 determines that the images are similar and disposes of the image selected from the section. On the other hand, in a case when the similarity degree is less than the determination threshold value, the similarity determination unit 1110 holds the selected image.

It is favorable to change the determination threshold value in accordance with the image capturing time difference between images to be compared. For example, in a case when similarity degree results are output in a range between 0 and 100 and the closer the similarity degree results to 100, the higher the similarity degree is, on a condition that the image capturing time difference is small (for example, within fifteen seconds), as in a case of continuous image capturing, the determination threshold value is set to sixty and in the other cases, the determination threshold value is set to eighty.

An integration unit 1111 selects an image that is left finally from images in each section, which are determined to be not similar by the similarity determination unit 1110. At this time, the integration unit 1111 uses the same score used for the determination by the image selection unit 1109 and selects an image whose score is high as an image that is left finally. However, the present invention is not limited to this. For example, it may also be possible to select the final image by giving importance to the dispersion of the dates of image capturing so that images are not selected continuously from adjacent sections.

An image management unit 1112 counts the number of already-selected images each time a new image is selected by the integration unit 1111 and determines whether the necessary number of images set by the number of images setting unit 1101 is exceeded. In a case when the necessary number of images is reached, the image selection processing is terminated. In a case when the necessary number of images is not reached, the image management unit 1112 increments the loop counter 1103 and performs the above-described image selection processing again.

In the above, for explanation, the example is explained in which images including the same object are selected for the main slot and the sub slot, but it may also be possible to set different objects for the main image and the sub image. In this case, for example, on a condition that the loop count is one, an image for the main slot is selected, and therefore, it is only required to switch objects between a case when the loop count is one and a case when the loop count is not one.

Figure 12B:
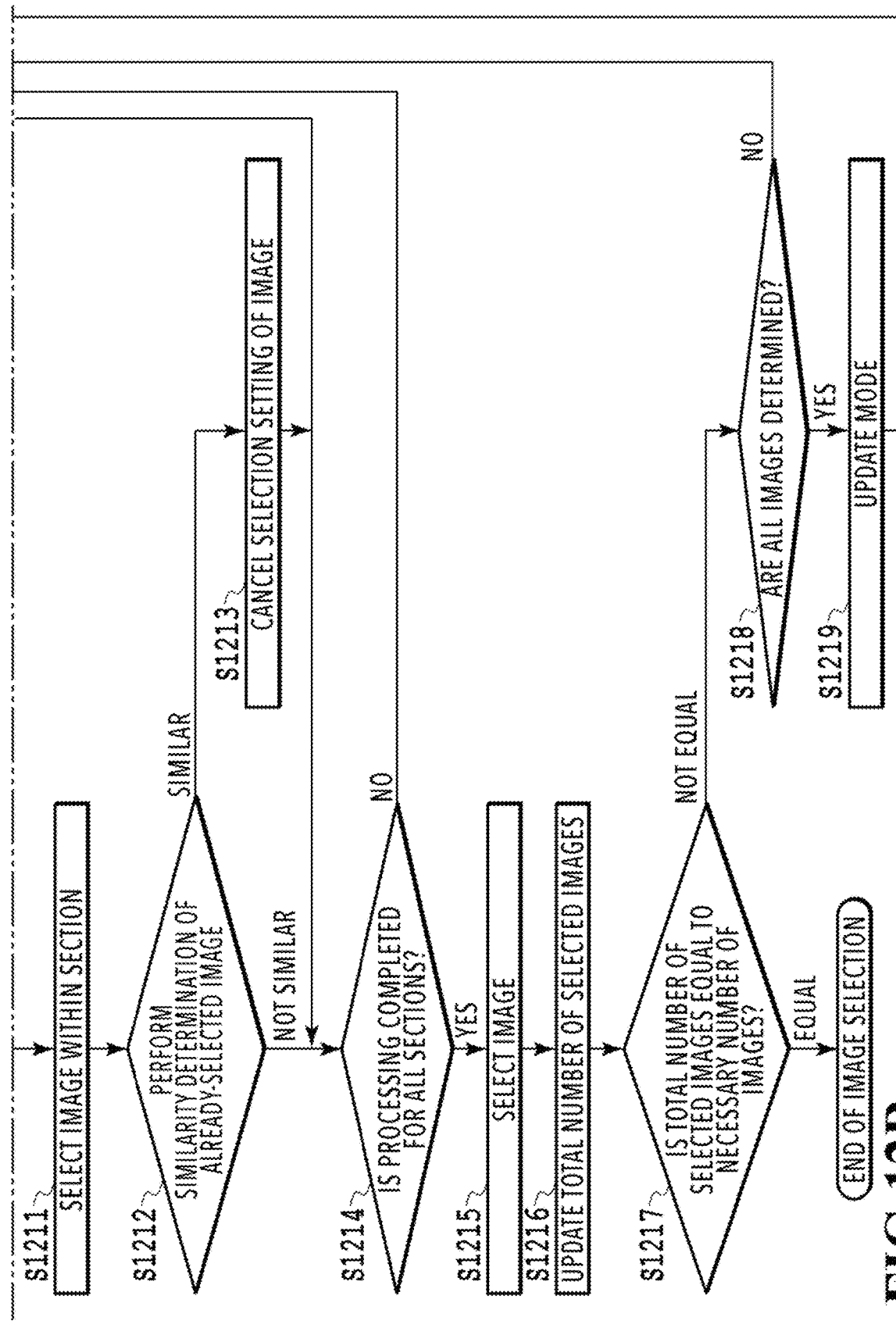
FIG. 12B is a flowchart for explaining steps of image selection.

FIG. 12A and FIG. 12B are flowcharts for explaining steps of image selection performed in the software block diagram explained in FIG. 11. This flowchart corresponds to the subroutine of the image selection performed by the CPU 101 at S423 in FIG. 4A and FIG. 4B. As in the case with FIG. 4A and FIG. 4B, this flowchart is also implemented by the CPU 101 reading a program stored in the HDD 104 onto the ROM 102 or the RAM 103 and executing the program in terms of hardware. In terms of software, this flowchart is processing performed by the CPU 101 via each block in FIG. 11.

At S1201, the number of images setting unit 1101 sets the total number of images to be selected for the sub image group allocated to the processing-target double-page spread.

At S1202, the image group acquisition unit 1102 acquires image data corresponding to the sub image group (sub image data group) allocated to the processing-target double-page spread from the image data of the image data group acquired by the image acquisition unit 205.

At S1203, the mode setting unit 1108 sets a mode.

At S1204, the loop counter 1103 counts the number of times processing to select an image is performed. The initial value of the loop counter 1103 is zero.

At S1205, the score axis setting unit 1104 sets a score axis that is made use of. In the present embodiment, a score axis that is made use of is set in accordance with the counter value managed by the loop counter.

At S1206, the kind of image setting unit 1106 sets the kind of image to be selected. In a case when the loop count is zero, that is, in a case when the number of times of selection is one, the kind of image setting unit 1106 selects an SNS image. In a case when the loop count is one, that is, in a case when the number of times of selection is two, the kind of image setting unit 1106 selects a moving image cutout image.

At S1207, the division unit 1105 finds the image capturing period of the sub image group from the image capturing start time and the image capturing end time of the sub image group allocated to the processing-target double-page spread and divides the image capturing period of the sub image group based on the number of times of selection counted by the loop counter 1103.

At S1208, the section information setting unit 1107 divides image data of the acquired sub image group into groups for each divided section and acquires the image capturing information on each image and the score of each image for each section.

At S1209, the image selection unit 1109 determines whether or not the image in the section of interest divided by the division unit 1105 is already selected. In a case of the section of interest is an already-selected section, the processing advances to S1214 and, in a case when the section of interest is a section not selected yet, the processing advances to S1210. In the first loop, the section is not divided, and, therefore, the number of sections of interest is one.

At S1210, the image selection unit 1109 determines whether or not an image including an object in the set mode is included in the section of interest. In a case when an object of the set mode is not included, the processing advances to S1214. In a case when an object of the set mode is included, the processing advances to S1211.

At S1211, the image selection unit 1109 selects one image from the section of interest based the score axis set by the score axis setting unit 1104, the mode set by the mode setting unit 1108, and the score of the image set by the section information setting unit 1107.

At S1212, the similarity determination unit 1110 performs similarity determination with the selected image selected by the counter for the image selected by the image selection unit 1109. In a case when it is determined that the images are not similar, the selected image is held and the processing advances to S1214. In a case when it is determined that the images are similar, the selection setting of the selected image is cancelled (S1213) and the processing advances to S1214.

At S1214, whether the image selection processing has been performed for all the sections is determined. Then, in a case when the image selection processing has been performed for all the sections, the processing advances to S1215. In a case when a section for which the selection processing is performed remains, the processing returns to S1208, and the selection processing at S1208 to S1212 is performed for the next unselected section.

At S1215, the integration unit 1111 selects an image that is left finally from images in each section, which are determined to be not similar by the similarity determination unit 1110. That is, in a case when two or more images remain after the processing at S1209 to S1214, an image that is left is selected.

At S1216, the image management unit 1112 updates the count number of already-selected images.

At S1217, the image management unit 1112 determines whether the current count number of already-selected images coincides with the necessary number of images set by the number of images setting unit 1101 at S1201. In a case when the necessary number of images and the total number of selected images coincide with each other, this processing is terminated and the processing advances to S424 in FIG. 4A and FIG. 4B. On the other hand, in a case when the total number of selected images does not reach the necessary number of images, the processing advances to S1218.

At S1218, the image management unit 1112 determines whether or not all the images of the sub image group have been determined for the mode set at S1203. In a case when all the images have not been determined yet, the processing returns to S1204 and the processing for selecting the next image is continued. At this time, the counter managed by the loop counter 1103 is incremented by one. Because of this, at the time of the processing advancing to S1207 next, the sub image group is divided into sections whose number is larger (twice the number of the previous time). As a result, the order of the score of each image within the section changes, and, therefore, an image that was not selected the previous time at S1211 has a chance of being selected.

On the other hand, in a case when it is determined that all the images have been determined at S1218, the processing advances to S1219.

S1219 is a step to which the processing advances in a case when the total number of selected images does not reach the necessary number of images even though the determination of all the image has been completed. Consequently, in this case, the mode setting unit 1108 switches the mode specified by the album creation condition specification unit 201 to another mode. It may also be possible to determine a new mode to which is the current mode is switched in accordance with priority determined in advance, or to set a new mode based on an object included in the sub image group.

After a new mode to which the current mode is switched is determined at S1219, the processing returns to S1203 and the mode setting unit 1108 performs mode setting of the mode to which the previous mode has been switched. After this, until it is determined that the total number of selected images reaches the necessary number of images, the processing at S1204 to S1219 is repeated.

Returning to FIG. 4A and FIG. 4B again, at S424, the template setting unit 214 determines a template suitable to the layout of the selected images from a plurality of templates read from the HDD 104 based on the album setting conditions set at S401.

Figure 13:
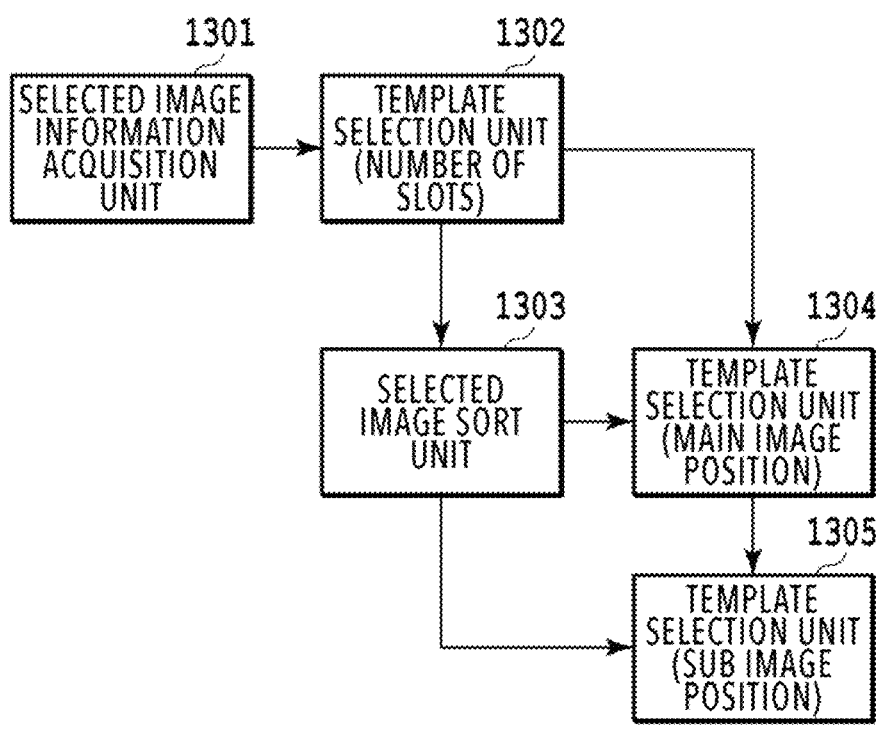
FIG. 13 is a software block diagram for implementing image layout determination steps.

FIG. 13 is a software block diagram for implementing the image layout determination step at S425. This block diagram shows the image layout unit 215 in FIG. 2, which is the software block already explained, in more detail.

A selected image information acquisition unit 1301 acquires the number of images selected by the image selection unit 213 and information relating to those images. The image information that is acquired is the width and height of the image, the date of image capturing information, and the score calculated by the image scoring unit 210.

In FIG. 13, a template selection unit (number of slots) 1302 selects a template having the same number of slots as the number of selected images from a plurality of templates read from the HDD 104.

A selected image sort unit 1303 sorts the selected images in order of the date of image capturing. In the present embodiment, as an example, this information is made use of for laying out images so that the date of image capturing becomes newer from the top left toward the bottom right.

A template selection unit (main image position) 1304 selects a template from templates (for example, a plurality of templates as shown in FIG. 10) selected by the template selection unit (number of slots) 1302. In more detail, the template selection unit (main image position) 1304 selects one or more templates on which the main image is located at the main slot position in a case when images are arranged in order of the date sorted by the selected image sort unit 1303. At this time, the aspect ratio of the main image being similar to that of the main slot is taken to be one of the selection conditions, in addition to the order of the date.

A template selection unit (sub image position) 1305 selects a template on which the aspect ratio of the sub image is similar to that of the sub slot in a case when the images are arranged in order of the date of image capturing from one or more templates selected by the template selection unit (main image position) 1304.

Figure 14:
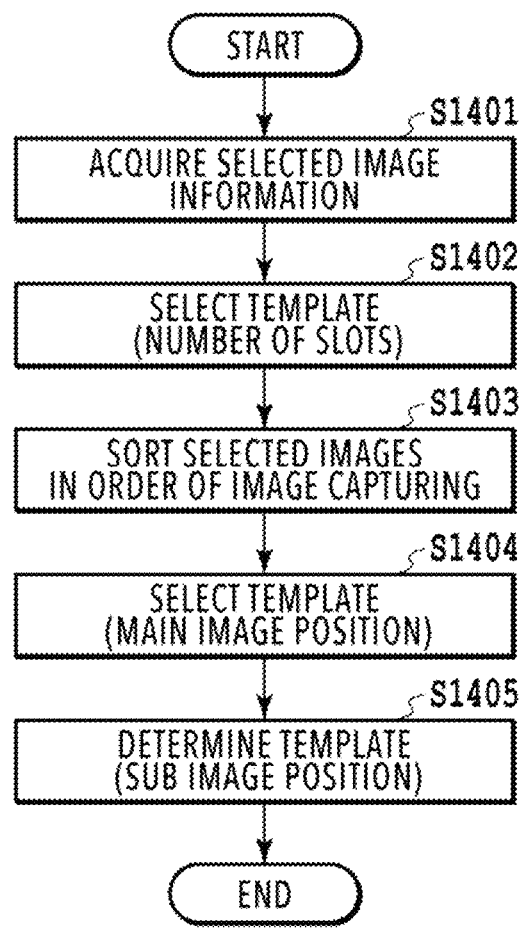
FIG. 14 is a flowchart for explaining image layout steps.

FIG. 14 is a flowchart for explaining the image layout step performed in the software block diagram explained in FIG. 13. This flowchart corresponds to the subroutine of the image layout performed by the CPU 101 at S425 in FIG. 4A and FIG. 4B. As in the case with FIG. 4A and FIG. 4B, this flowchart is also implemented by the CPU 101 reading a program stored in the HDD 104 onto the ROM 102 or the RAM 103 and executing the program in terms of hardware. In terms of software, this flowchart is processing performed by the CPU 101 via each block in FIG. 13. In the following, with reference to FIG. 13, each step of the flowchart in FIG. 14 is explained in order.

In a case when this processing is started, first, at S1401, the selected image information acquisition unit 1301 acquires the image information selected by the image selection unit 213. As an example, here, it is assumed that the number of selected images is three.

At S1402, the template selection unit (number of slots) 1302 selects a template having the same number of slots as the number of selected images acquired at S1401. That is, a template whose number of slots is three is selected. Here, for example, it is assumed that (1-1) to (4-4) in FIG. 10 are selected.

At S1403, the selected image sort unit 1303 arranges the selected images in order of the date of image capturing. Here, it is assumed that three images of a main image 1005, a sub image 1006, and a sub image 1007 are sorted in the order of the date as shown at the lower portion in FIG. 10.

At S1404, the template selection unit (main image position) 1304 compares the template selected at S1402 with the selected images sorted at S1403. Then, the template selection unit 1304 selects one or more templates on which the main image corresponds to the position of the main slot and the aspect ratio of the main image and that of the main slot are similar to each other. In a case of the three images 1005, 1006, and 1007, the image 1005 whose date of image capturing is the newest is the main image, and, therefore, the templates of (1-1) to (1-4) in FIG. 10 are selected.

At S1405, the template selection unit (sub image position) 1305 selects a template on which the position of the sub slot and the aspect ratio coincide for the sub image from the templates selected at S1404. In the case of the three images 1005, 1006, and 1007, the sub image 1006 having the oldest date of image capturing is a portrait image and the sub image 1007 having the second oldest date of image capturing is a landscape image, and, therefore, (1-2) is selected from (1-1) to (1-4) in FIG. 10.

By the above, the layout processing of the selected images is completed and the processing returns to FIG. 4A and FIG. 4B. That is, at S425 in FIG. 4A and FIG. 4B, information capable of identifying the template used for layout and which image is laid out in which slot of the template is determined.

Explanation of FIG. 4A and FIG. 4B is continued. At S426, the image correction unit 217 performs image correction. This step is performed only in a case when the image correction is set to ON in the checkbox 308 in FIG. 3 and, in a case when the image correction is OFF, this step is skipped. As the kind of image correction, mention is made of, for example, dodging correction, red-eye correction, and contrast correction. The correction such as this is performed in the sRGB format state.

At S427, the layout information output unit 218 creates layout information. That is, the layout information output unit 218 lays out the images selected at S423 on the template selected at S424 in accordance with the information determined at S425. In detail, each image is enlarged or reduced so as to adapt to the corresponding slot and after being laid out in the slot, the image is converted into bitmap data. The image used here is the image after the correction processing at S426 has been performed for the analyzed image generated at S407.

At S428, whether or not the processing at S423 to S427 has been completed for all the double-page spreads is determined. In a case when there remains a double-page spread that should be processed (No at S428), the processing returns to S423 and the processing for the next double-page spread is continued. In a case when the processing at S423 to 427 has been completed for all the double-page spreads (Yes at S428), the automatic layout processing is terminated. By the series of processing explained above, the automatic layout of the album creation application is completed. Based on the completed layout results, printing is performed on sheets and an album (photo book) is generated.

In the above, selection and grouping of images are performed based on the mode specified by a user by using the display screen 301, but it may also be possible to automatically set the mode by analyzing a plurality of images provided by a user.

<Layout Processing for Template Having Background Slot>

In the automatic layout processing of the present embodiment, in a case when there is a template on which a background slot is provided behind each slot (foreground slot), it is also possible to arrange a selected image in the background slot. At this time, it may also be possible for a user to specify whether or not to arrange a selected image in the background slot, or it may also be possible to automatically determine whether or not to arrange a selected image in the background slot for each double-page spread based on the sub image group. In the following, processing in a case when a selected image is arranged in the background slot is explained in detail.

Figure 15:
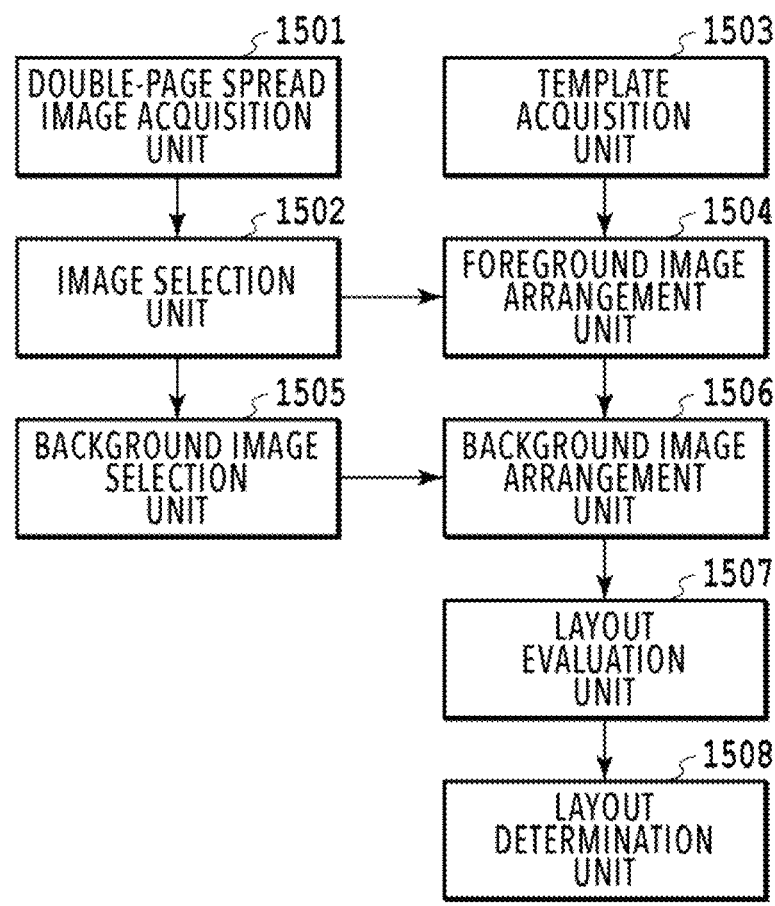
FIG. 15 is a software block diagram in a case when a background image is laid out.

FIG. 15 is a software block diagram in a case when a selected image is arranged in the background slot. This block diagram corresponds to a combination of the image selection unit 213 and the image layout unit 215 in FIG. 2.

In FIG. 15, a double-page spread image acquisition unit 1501 acquires a sub image group allocated to each double-page spread by the double-page spread allocation unit 212. An image selection unit 1502 selects images actually displayed on a double-page spread from the sub image group allocated to the double-page spread. As the selection method, it may also be possible to adopt the method explained for the image selection unit 213 in FIG. 2 or to adopt another method.

A template acquisition unit 1503 acquires one or more templates set by the template setting unit 214. The template is managed in units of double-page spreads of an album and has layer information indicating the number, the width, the height, the position on the double-page spread, and the overlapping order of slots for the slots in which images are arranged, and the slot number for identifying a slot within the template.

In the present embodiment, a background slot for using a selected image as a background is prepared for each template. At this time, it may also be possible to take the slot whose layer information on the template indicates the lowest layer as a background slot or to prepare a background slot in a case when specific layer information is set.

A foreground image arrangement unit 1504 arranges an image selected by the image selection unit 1502 as a foreground image based on the slot of the template acquired by the template acquisition unit 1503. A background image selection unit 1505 selects one of the images selected by the image selection unit 1502 as a background image. That is, one of the images selected by the image selection unit 1502 is selected both as the background image and as the foreground image.

A background image arrangement unit 1506 lays out the background image selected by the background image selection unit 1505 based on the background slot information on the template acquired by the template acquisition unit 1503.

A layout evaluation unit 1507 evaluates a layout state of the double-page spread specified by the foreground image arrangement unit 1504 and the background image arrangement unit 1506. The layout of the double-page spread specified by the foreground image arrangement unit 1504 and the background image arrangement unit 1506 is different for each template, and the layout evaluation unit 1507 calculates an evaluation value corresponding to each template. The calculation method of an evaluation value will be explained later in detail.

A layout determination unit 1508 compares evaluation values corresponding to each template, which are calculated by the layout evaluation unit 1507, and determines a layout that is adopted finally.

Figure 16:
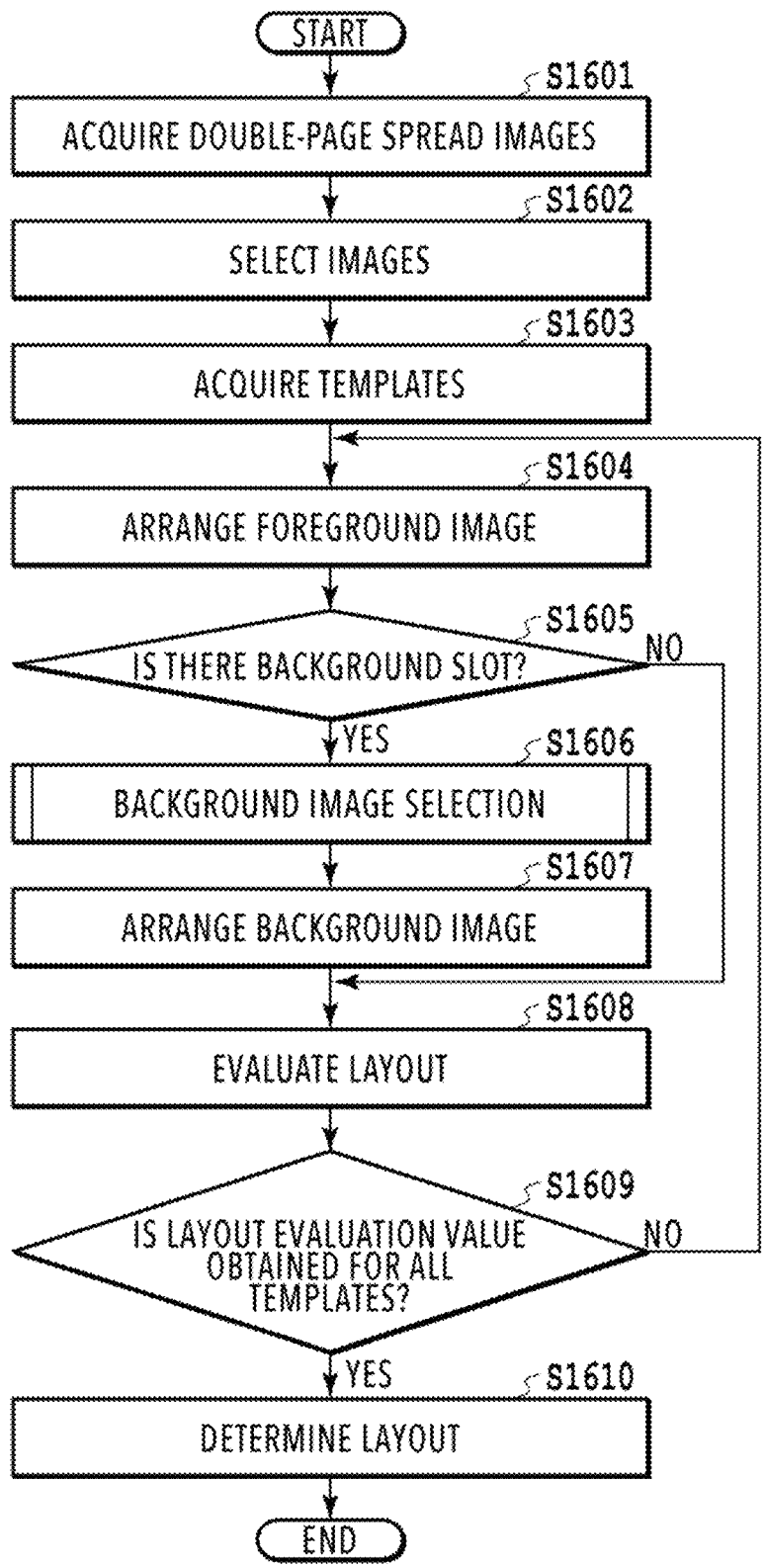
FIG. 16 is a flowchart for explaining layout determination steps.

FIG. 16 is a flowchart for explaining layout determination steps in a case when one of selected images is laid out as a background image, which is performed in the software block diagram explained in FIG. 15. This flowchart corresponds to the subroutine of the image layout performed by the CPU 101 at S425 in FIG. 4A and FIG. 4B. As in the case with FIG. 4A and FIG. 4B, this flowchart is also implemented by the CPU 101 reading a program stored in the HDD 104 onto the ROM 102 or the RAM 103, and executing the program in terms of hardware. In terms of software, this flowchart is processing performed by the CPU via each block in FIG. 13. In the following, with reference to FIG. 15, each step of the flowchart in FIG. 16 is explained in order.

In a case when this processing is started, first, at S1601, the double-page spread image acquisition unit 1501 acquires the sub image group allocated to the double-page spread by the double-page spread allocation unit 212. At S1602, the image selection unit 1502 selects images actually displayed on the double-page spread from the sub image group acquired at S1601. As the selection method, it may also be possible to adopt the method explained by using the image selection unit 213 in FIG. 2 and FIG. 9, or to adopt another method. For example, it may also be possible for the image selection unit 1502 to select all the image included in one sub image group allocated to one double-page spread. This is effective in a case of a method of manually selecting images, not a method in which images used for layout are automatically selected by an application based on the score of an image from a plurality of images. That is, in a case of a method in which a user manually selects images desired to be laid out and an application performs layout by using the selected images, it is better for the image selection unit 1502 to select all the images included in one sub image group.

At S1603, the template acquisition unit 1503 acquires templates set at S424. At S1604, the foreground image arrangement unit 1504 lays out images selected at S1602 on one template set at S1603. That is, in the foreground slot possessed by the processing-target template, the image selected at S1602 is laid out.

At S1605, the background image selection unit 1505 determines whether or not a background slot is prepared for the current processing-target template and, in a case when no background slot is prepared, the processing advances to S1608. On the other hand, in a case of determining that a background slot is prepared at S1605, the background image selection unit 1505 selects one of the images selected at S1602 as a background image at S1606.

Figure 17:
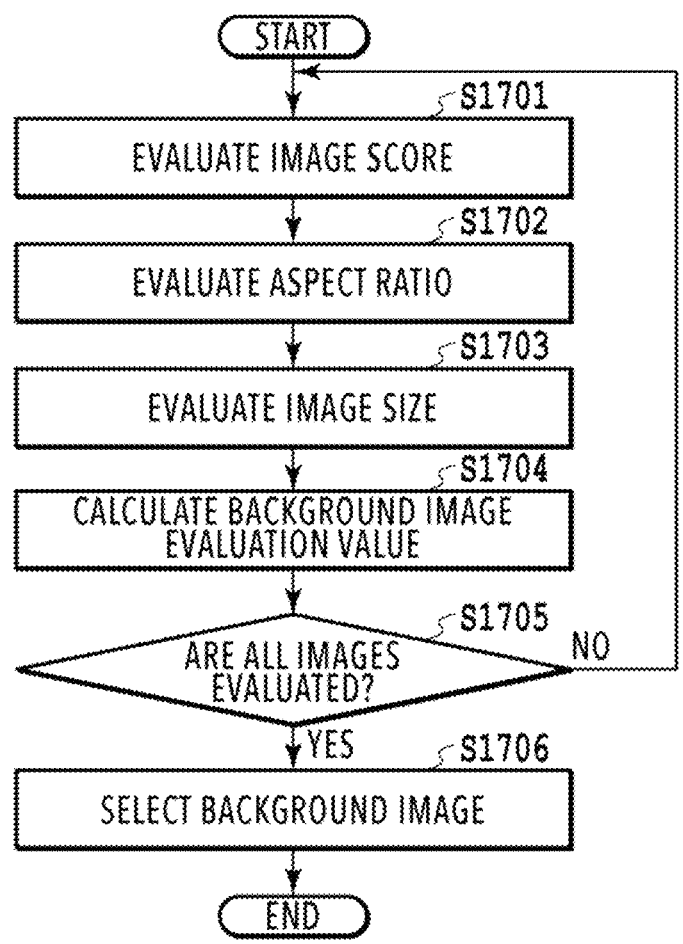
FIG. 17 is a flowchart for explaining image selection processing.

FIG. 17 is a flowchart for explaining selection processing performed by the background image selection unit 1505 at S1606. At S1701, the background image selection unit 1505 takes out one of the images selected at S1602 as a background candidate image and evaluates an image score for the image. Specifically, for example, the sore acquired at S416 is taken as an image score and this is compared with a predetermined threshold value, and an image score evaluation value Es of 0 or 100 is obtained.

At S1702, the background image selection unit 1505 performs aspect ratio evaluation. Specifically, the background image selection unit 1505 compares the aspect ratio of the background candidate image with the aspect ratio of the background slot, that is, the album double-page spread surface and calculates an aspect ratio evaluation value Ea The aspect ratio evaluation value Ea is a value that becomes high in a case when the similarity degree of the aspect ratios is high and, in a case when the aspect ratios coincide perfectly with each other, the aspect ratio evaluation value Ea is 100. In the present embodiment, it is made possible to adapt an image whose aspect ratio does not coincide with that of the background slot to the background slot by trimming a part of the image. However, in a case when the difference in the aspect ratio is large, the enlargement ratio at the time of adapting the image to the background slot becomes large, and, therefore, as a result, the resolution of the displayed image is reduced. Consequently, in the present embodiment, the higher the similarity degree of the aspect ratios, the higher the score is caused to become.

At S1703, the background image selection unit 1505 performs image size evaluation. Specifically, the background image selection unit 1505 finds a size evaluation value El as to whether an image has a size larger than or equal to a predetermined size in the width direction and in the height direction. In the present embodiment, in a case when the size of one of the width and the height, which is smaller, is larger than or equal to a predetermined value, the size evaluation value El is taken to be 100 and, in a case when that is less than the predetermined size, the size evaluation value El is taken to be zero. In a case when the size of a background candidate image is too small, the enlargement ratio at the time of adapting the image to a background slot becomes large, and, as a result, the resolution of the displayed image becomes low, and, therefore, in the present embodiment, the size evaluation value El such as this is prepared.

At S1704, the background image selection unit 1505 calculates a background image evaluation value Eb, which is a comprehensive evaluation value, by using the image score evaluation value Es found at S1701, the aspect ratio evaluation value Ea found at S1702, and the size evaluation value El found at S1703. In the present embodiment, a weighting factor Ws for the image score evaluation value Es, a weighting factor Wa for the aspect ratio evaluation value Ea, and a weighting factor Wl for the size evaluation value El are prepared and the background image evaluation value Eb is calculated in accordance with an expression below.

$$Eb = Ws \times Es + Wa \times Ea + Wl \times El$$

At this time, it is sufficient for the weighting factors Ws, Wa, and Wl to be adjusted appropriately in accordance with the priority of each evaluation value. For example, in a case when the sheet of the album is a medium in which low resolution is likely to be conspicuous, such as a photo glossy sheet, it may also be possible to increase Wa and Wl more than Ws in order to suppress a reduction in resolution due to trimming and enlargement processing.

At S1705, the background image selection unit 1505 determines whether or not the background image evaluation value Eb is obtained for all the images selected at S1602. In a case when the background image evaluation value Eb is obtained, the processing advances to S1706. On the other hand, in a case when there remains a background candidate image whose background image evaluation value Eb is not found yet, the processing returns to S1701 in order to perform the evaluation processing for the next background candidate image.

At S1706, the background image selection unit 1505 compares the background image evaluation values Eb of all the background candidate images and determines the background candidate image having the maximum background image evaluation value Eb to be the background image that should be caused to correspond to the background slot. By the above, this processing is terminated.

In the above, the three evaluation values, that is, the image score evaluation value Es, the aspect ratio evaluation value Ea, and the size evaluation value El are adopted as evaluation values for finding the background image evaluation value Eb, but the kinds of evaluation value, that is, the evaluation items are not limited to those. For example, it may also be possible to preferentially select an image in which a main object is not included, such as a scenery image, rather than an image in which a main object, such as a face of a person, is included. Further, even in a case of an image in which a main object is included, an image in which the main character is not included may be selected preferentially.

Returning to the flowchart in FIG. 16, in a case when a background image is selected at S1606, the background image arrangement unit 1506 arranges the background image selected at S1606 based on the background slot information on the processing-target template.

At S1608, the layout evaluation unit 1507 calculates a layout evaluation value for the layout crated by the processing-target template. As an evaluation element for calculating a layout evaluation value, mention is made of the similarity degree of the aspect ratios between the images in all the slots included in the processing-target template and the slots, the consistency between the order of arrangement of images and the dates of image capturing, and so on. It is also possible to adopt whether or not the main object is overlapped by another slot, whether the main object is located at the binding portion at the time of bookbinding, and so on, as an evaluation element.

At S1609, whether or not the layout evaluation value is obtained for all the templates acquired at S1603 is determined. In a case when the layout evaluation value is obtained for all the templates, the processing advances to S1610. On the other hand, in a case when there remains a template whose layout evaluation value is not found yet, the processing returns to S1604 in order to perform the evaluation processing for the next template.

At S1610, the layout determination unit 1508 compares the layout evaluation values of all the templates acquired at S1603 and determines the template having the maximum evaluation value to be the template (layout) of the double-page spread images acquired at 51601. By the above, this processing is terminated.

Figure 21A:
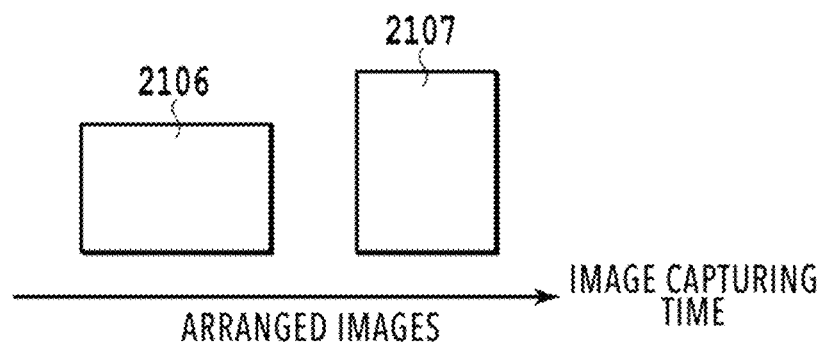
FIG. 21A and FIG. 21B are diagrams showing a specific example of layout determination processing.
Figure 21B:
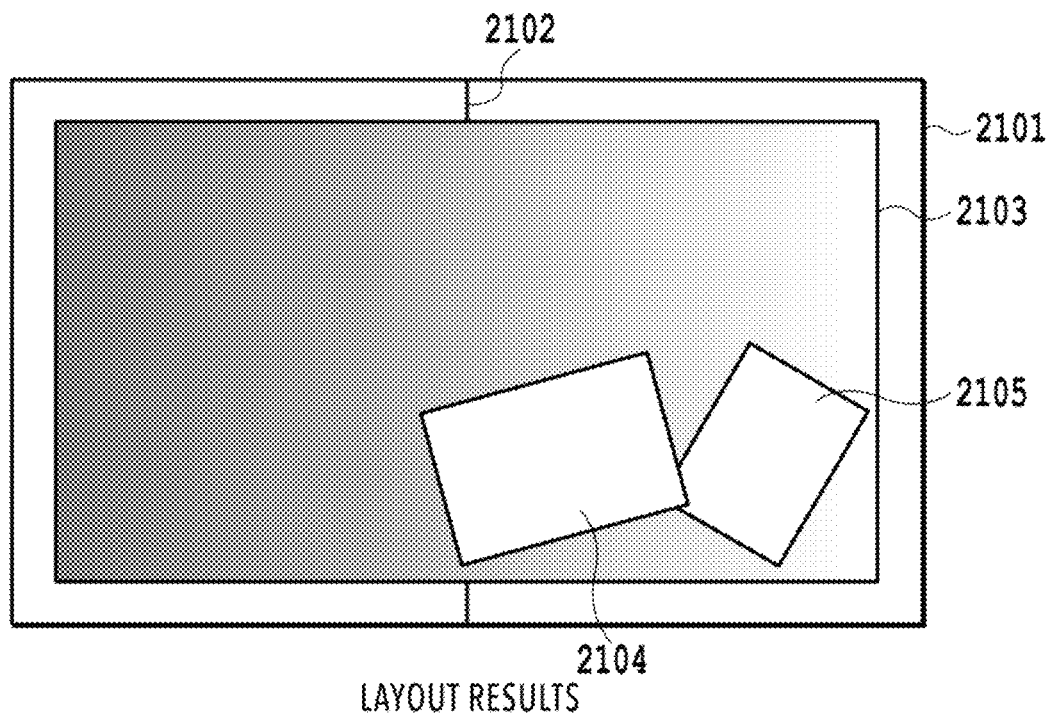

FIG. 21A and FIG. 21B are diagrams showing a specific example of the layout determination processing explained above. FIG. 21A shows a first image 2106 and a second image 2107 selected by the image selection unit 1502 and FIG. 21B shows a template, which is a processing target.

In FIG. 21A, the first image 2106 is a landscape image and the second image 2107 is a portrait image. In this example, it is assumed that the date of image capturing of the first image is earlier and the score of the first image, which is calculated at S416, is higher.

In the template in this example shown in FIG. 21B, on almost the entire surface of a layout area 2101, a background slot 2103 is arranged and on the front side of a part of the background slot 2103, a first foreground slot 2104 and a second foreground slot 2105 are arranged. The part of the background slot 2103 is covered by the first foreground slot 2104 and the second foreground slot 2105 and the part of the area is not visible. Further, a part of the second foreground slot 2105 is also covered by the first foreground slot 2104 and the part of the area is not visible. At the center of the layout area 2101, a binding portion 2102 of the album is located.

In the situation such as this, the background image selection unit 1505 selects a background image from the first image 2106 and the second image 2107 in accordance with the flowchart shown in FIG. 17. In this example, it is assumed that the image score evaluation value Es and the size evaluation value El of the first image 2106 and those of the second image 2107 are equal. On the other hand, the aspect ratio evaluation value Ea of the first image 2106, which is a landscape image, is higher than that of the second image 2107, which is a portrait image. Because of this, the background image evaluation value Eb calculated at S1704 of the first image 2106 is higher than that of the second image 2107. As a result, the background image selection unit 1505 selects the first image as a background image and the background image arrangement unit 1506 adjusts the shape and size of the first image 2106 and lays out in the background slot.

The foreground image arrangement unit 1504 arranges the first image 2106 and the second image 2107 in the first foreground slot 2104 and in the second foreground slot 2105, respectively, of the template. Although details are omitted, the association between the foreground slot and the image is determined based on the aspect ratio and the order of the image capturing time and, in this example, the first image 2106 is laid out in the first foreground slot 2104 and the second image 2107 is laid out in the second foreground slot 2105.

According to the above-described layout, the first image 2106 is laid out both in the background slot 2103 and in the foreground slot 2104. That is, the image information on the area covered by the first foreground slot 2104 and the second foreground slot 2105 in the background slot 2103 is displayed in the first foreground slot 2104. Because of this, in a case when a completed album is appreciated, a user does not feel a lack of image in the background slot 2103. Consequently, it is made possible to improve the degree of satisfaction of a user and for the user to recognize the album as a characteristic design without a feeling of incongruity.

Further, as in the present embodiment, in the situation in which the same image as that in the foreground slot 2104 is displayed in the background slot 2103, it is possible to further perform a variety of kinds of effect processing for the background slot 2103. For example, it is possible to apply gradation in the horizontal direction as shown in FIG. 21B. Further, it is also possible to convert a color image into a monochrome image or into a sepia color image, to apply a blurring filter, to perform mosaic processing, and so on. Even in a case when whatever effect processing is performed, the image information possessed by the background image is displayed clearly by the foreground image, and, therefore, it is possible for a user to enjoy the design without having a feeling of incongruity. In other words, by displaying one of images displayed as the foreground images as the background image, it is possible to broaden the range of the design of the background image.

The presence/absence or the kind of the effect processing such as this may be specified by a user or may be determined automatically from the selected images. For example, in a case when the luminance range of the background image is wide, it may also be possible to enhance the foreground image by turning the background image into a monochrome image. Further, in a case when the size of the image selected as the background image is small, and there is a possibility that there is a disturbance in the image accompanying a reduction in resolution in a case when the size of the image is enlarged to the size of the background slot, it is also effective to perform blurring processing for the entire image. In a case when a main object is included in the background image, it is preferable to shift the start position of gradation processing from the main object so that the main object is not affected by the gradation processing.

As explained above, according to the present embodiment, in a case when an album is created by using images provided by a user, it is possible to layout a background image and foreground images without giving a user a feeling of incongruity.

Second Embodiment

In the first embodiment, almost the entire area of a double-page spread is the area occupied by a background slot. That is, the background slot is provided across the double-page spread page. However, there is also a case when the background slot and the foreground slot are laid out on the right or left side of the double-page spread, that is, laid out on different pages, while avoiding the binding portion located at the center of the double-page spread. In such a case, there is a foreground slot of a plurality of foreground slots, which is laid out so as to overlap the background slot and there is a foreground slot that is laid out without overlapping the background slot. In the present embodiment, a background image is selected from a plurality of images based on an overlap relationship between a background slot and foreground slots as described above.

Figure 18:
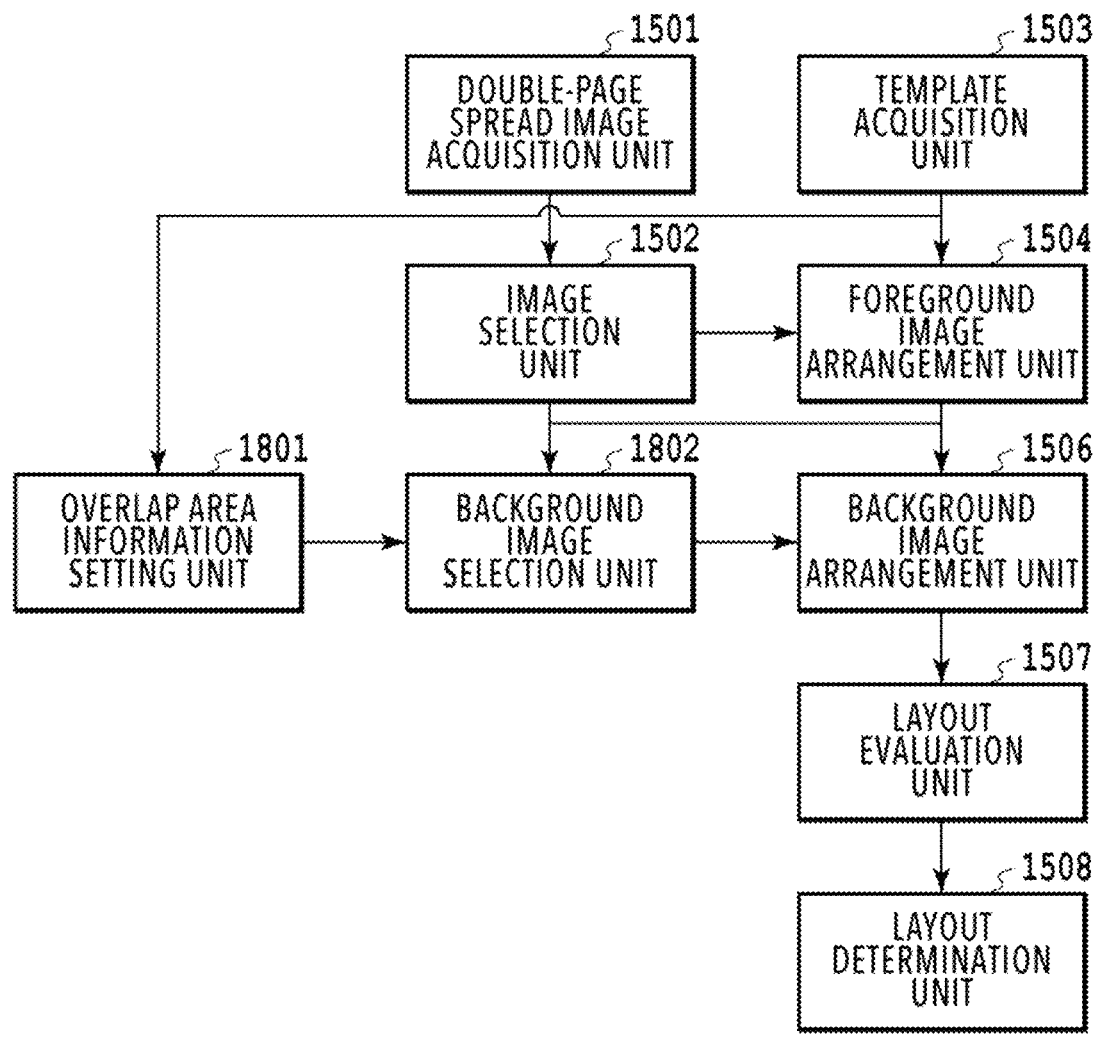
FIG. 18 is a software block diagram in a case when a background image is laid out.

FIG. 18 is a software block diagram in a case when one of selected images is laid out as a background image in the present embodiment. For the block diagram in FIG. 15, which is explained in the first embodiment, an overlap area setting unit 1801 is further added. Further, the processing contents of a background image selection unit 1802 are changed.

The overlap area setting unit 1801 sets overlap area information on a background slot and foreground slots on a double-page spread plane by analyzing template information acquired by the template acquisition unit 1503. The processing contents of the background image selection unit 1802 will be described later in detail. The configurations other than the overlap area setting unit 1801 and the background image selection unit 1802 are the same as those explained in FIG. 15, and, therefore, an explanation is omitted here.

Figure 19:
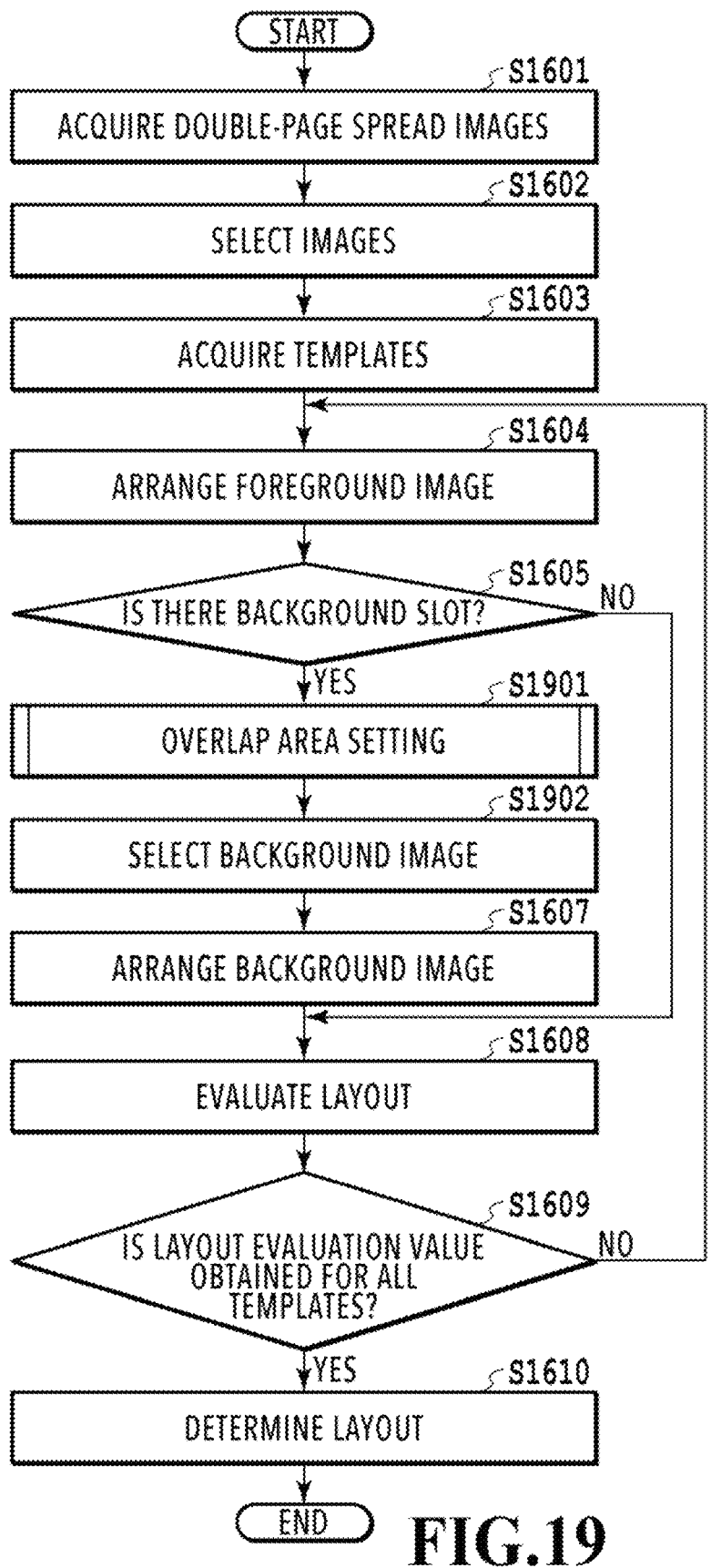
FIG. 19 is a flowchart for explaining layout determination steps.

FIG. 19 is a flowchart for explaining layout determination steps performed in the software block diagram of the present embodiment explained in FIG. 18. For the flowchart in FIG. 16 explained in the first embodiment, S1901 is added and the background image selection step at S1902 is changed. The overlap area setting unit 1801 is further added. In the following, only the characteristic steps of the present embodiment are explained with reference to the block diagram in FIG. 18.

At S1901, the overlap area setting unit 1801 sets overlap area information on a background slot and foreground slots on a double-page spread plane by analyzing template information acquired by the template acquisition unit 1503. Specifically, the overlap area setting unit 1801 acquires information on the position, width, and height of each slot from the template information and specifies a foreground slot that overlaps the background slot. At this time, in a case when center coordinates of a foreground slot are included in the template information, it is also possible to determine whether or not a foreground slot overlaps the background slot based on the coordinates. In a case when center coordinates of a foreground slot are not included in the template information, it may be possible to determine whether or not a foreground slot overlaps the background slot based on the width and height of the foreground slot.

At S1902, the background image selection unit 1802 selects one of the images selected at S1502 as a background image.

Figure 20:
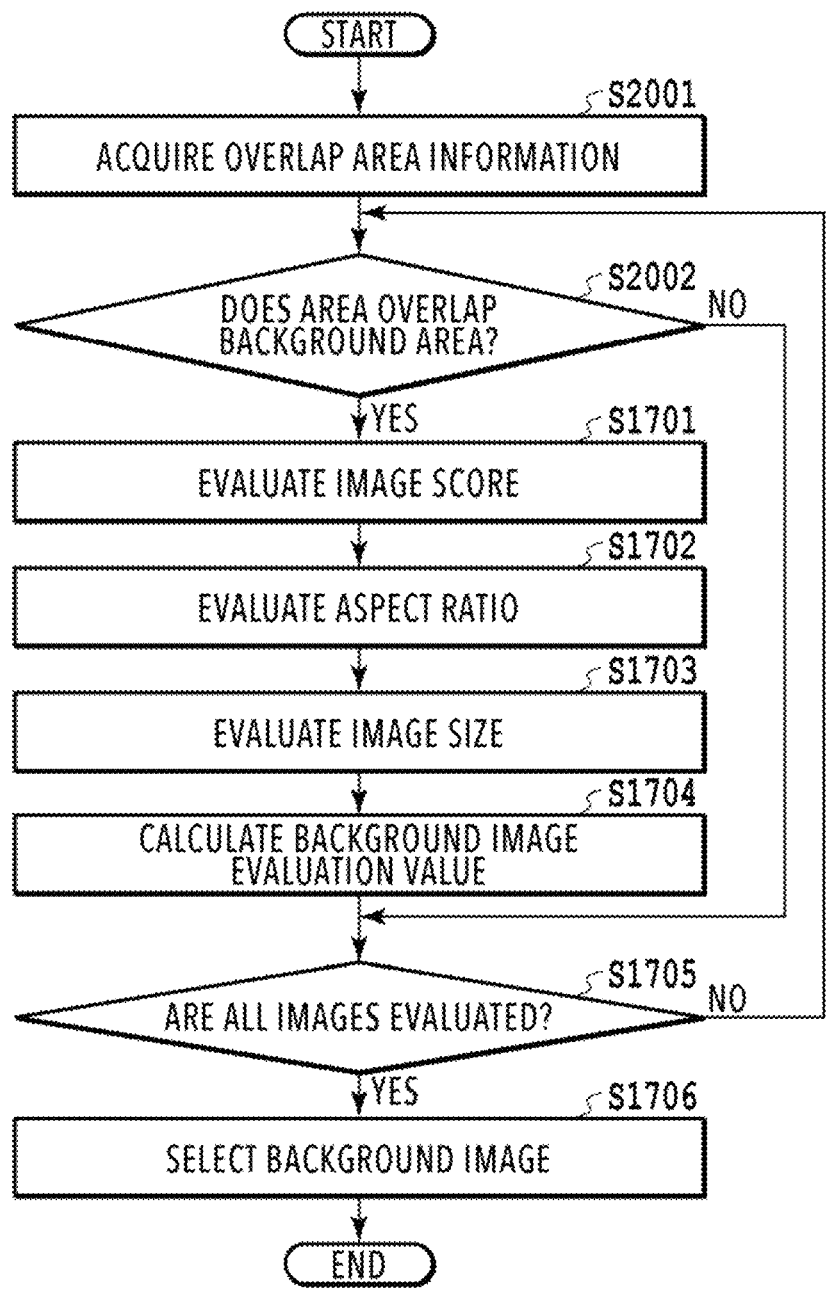
FIG. 20 is a flowchart for explaining background image selection processing.

FIG. 20 is a flowchart for explaining selection processing performed by the background image selection unit 1802 at S1902 in FIG. 19. In a case when this processing is started, first, at S2001, the background image selection unit 1802 acquires overlap area information set by the overlap area setting unit 1801 at S1901.

At S2002, the background image selection unit 1802 takes out one of the images arranged in the foreground slots as a background candidate image at S1604. Then, the background image selection unit 1802 determines whether or not the foreground slot in which the image is laid out overlaps the background slot while referring to the overlap area information acquired at S2001. In a case when it is determined that the foreground slot overlaps the background slot, the processing advances to S1701 in order to perform further evaluation as a background image for the image.

On the other hand, in a case of determining that the foreground slot in which the current background candidate image is laid out does not overlap the background slot as S2002, the background image selection unit 1802 excludes the image from the background candidates, and advances the processing to S1705, and performs evaluation of the next background candidate image. Steps after S1701 are the same as the steps already explained by using FIG. 17 in the first embodiment, and, therefore, an explanation is omitted here.

Further, in the flowchart in FIG. 19, steps after S1902 at which the background image is selected are the same as the steps already explained by using FIG. 16 in the first embodiment, and, therefore, an explanation is omitted here.

As above, according to the present embodiment, of a plurality of selected images, only the image that is laid out in the foreground slot laid out so as to overlap the front side of the background slot is a candidate of an image that can be laid out in the background slot.

Figure 22A:
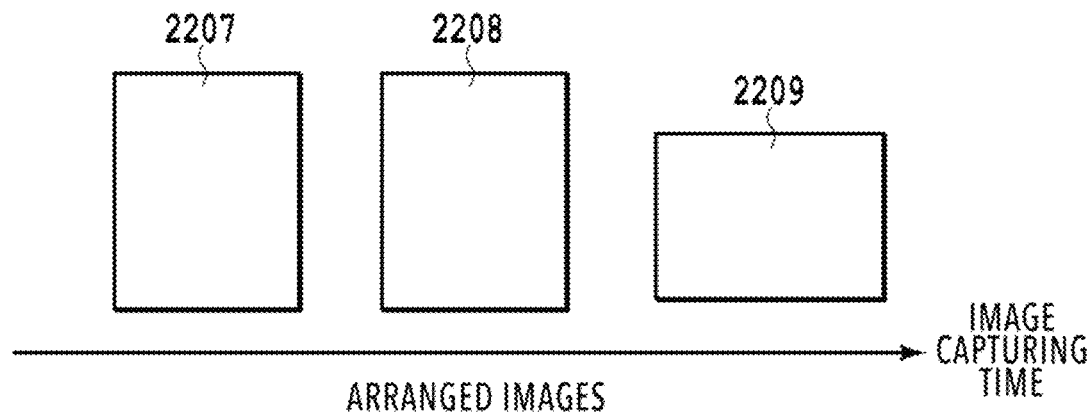
FIG. 22A and FIG. 22B are diagrams showing a specific example of layout determination processing.
Figure 22B:
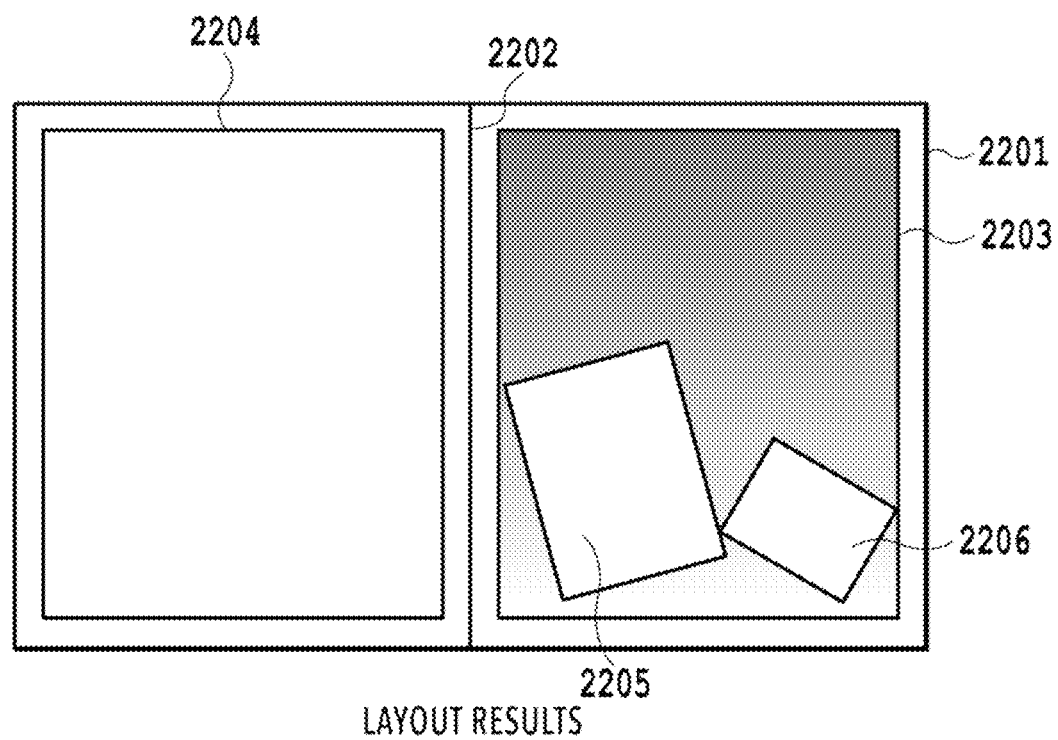

FIG. 22A and FIG. 22B are diagrams showing a specific example of the layout determination processing in the present embodiment. FIG. 22A shows a first image 2207, a second image 2208, and a third image 2209 selected by the image selection unit 1502 and FIG. 22B shows a template that is the target of the processing.

In FIG. 22A, the first image 2207 is a portrait image, the second image 2208 is a portrait image, and the third image 2209 is a landscape image. Further, in this example, it is assumed that the date of image capturing is earlier in order of the first image 2207, the second image 2208, and the third image 2209, and the score calculated at S416 is higher in the same order.

In the template in this example shown in FIG. 22B, in almost the entire area on one side of a layout area 2201 with a binding portion 2205 being sandwiched in between, a background slot 2203 is arranged and a first foreground slot 2204 is arranged in the entire area on the other side. Further, on the front side of the background slot 2203, a second foreground slot 2205 and a third foreground slot 2206 are arranged. Because of this, a part of the background slot 2203 is covered by the second foreground slot 2205, and the third foreground slot 2206 and the image of the area is not visible.

In the situation such as this, at S1604 in FIG. 19, the foreground image arrangement unit 1504 lays out the images (2207, 2208, 2209) selected at S1602 in the foreground slots possessed by the processing-target template. Although details are omitted, the association between the background slot and the image is determined based on the aspect ratio and the order of the image capturing time. In this example, it is assumed that the first image 2207 is laid out in the first foreground slot 2204, the second image 2208 is laid out in the second foreground slot 2205, and the third image 2209 is laid out in the third foreground slot 2206.

Further, at S1901 in FIG. 19, the overlap area setting unit 1801 sets overlap area information on the background slot and the foreground slots on the double-page spread for each template. For the template shown in FIG. 22B, information indicating that the first foreground slot 2204 does not overlap the background slot 2203, and the second foreground slot 2205 and the third foreground slot 2206 overlap the background slot 2203 is set.

On the other hand, at S2001 in FIG. 20, the background image selection unit 1802 acquires the overlap area information set by the overlap area setting unit 1801. Then, the background image selection unit 1802 repeats the steps of S2002 to S1705 for each background candidate image while referring to the information.

In a case of the template shown in FIG. 22B, the first foreground slot 2204 in which the first image 2207 is laid out does not overlap the background slot 2203, and, therefore, the first image 2207 is excluded from the background candidate images at S2002. On the other hand, the second foreground slot 2205 in which the second image 2208 is laid out and the third foreground slot 2206 in which the third image 2209 is laid out overlap the background slot 2203. Because of this, these images are regarded as being the background candidate image and the background image evaluation value at S1701 to S1704 is calculated.

At S1706, the background image selection unit 1802 compares the background image evaluation values Eb of the second image 2208 and the third image 2209, and determines one of the images as a background image.

In this example, it is assumed that the image score evaluation value Es and the size evaluation value El of the second image 2208 are equal to those of the third image 2209. On the other hand, the aspect ratio evaluation value Ea of the second image 2208, which is a portrait image, is higher than that of the third image 2209, which is a landscape image. Because of this, the background image evaluation value Eb, which is calculated at S1704, of the second image 2208 is higher than that of the third image 2209. As a result, the background image selection unit 1802 of the present embodiment selects the second image as a background image and the background image arrangement unit 1506 adjusts the shape and size of the second image 2208 and lays out in the background slot 2203.

According to the above-described layout, the second image 2208 is laid out both in the background slot 2203 and in the foreground slot 2205. That is, the image information on the area covered by the second foreground slot 2205 and the third foreground slot 2206 in the background slot 2203 is also displayed in the second foreground slot 2205 arranged on the front side thereof. Because of this, in a case when the completed album is appreciated, it is unlikely that a user has a feeling of incongruity for the lack of the image in the background slot 2203, and, therefore, it is made possible for a user to recognize the album as a characteristic design. In the present embodiment also, it is possible to perform a variety of kinds of effect processing for the background slot 2203.

Incidentally, in the above, after determining images to be laid out in each foreground slot at S1604, based on the results thereof, the image to be laid out in the background slot is determined. However, it also is possible to reverse the order of the steps. That is, it is possible, after selecting an image most suitable as a background image from a plurality of images, to lay out the image in the foreground slot that overlap the background slot of a plurality of foreground slots. Even in the order such as this, it is possible to lay out the same image in the background slot and in the foreground slot that overlaps the background slot, and to provide an album that does not give a feeling of incongruity in a case when a user appreciates the album.

Other Embodiments

In the above embodiments, the contents are explained in which both the background slot and the foreground slot are laid out automatically with images selected from images provided by a user, but the present invention is not limited to those. Even in a case when a user selects an image to be laid out in the background slot, or images to be laid out in part of the foreground slots, on a condition that the same image is automatically laid out both in the background slot and in the foreground slot that overlaps the background slot, this falls under the category of the present invention. Further, the number of foreground slots that overlap one background slot may be one. In any case, it is possible to obtain the same effect as that of the above-described embodiments on a condition that the same image is automatically laid out both in the background slot and in the foreground slot that overlaps the background slot.

An image to be laid out is not limited to a captured photo image and, for example, it may also be possible to lay out an illustration or an image created by a user on an application. At this time, it is possible to perform the scene division at S412 and grouping for generating sub image groups on the basis of the date of creation of the image data.

Further, in the above-described embodiments, an explanation is given by taking the image processing apparatus in which the album creation application is installed as an example, but the present invention is not limited to the aspect such as this. The application and the image processing apparatus may be those including image selection processing to automatically select a recommended image.

In FIG. 1, an explanation is given by taking the image processing apparatus supposing a local environment as an example, but the image processing apparatus is not limited to this. It is also possible to use, for example, a server connected via a network and providing an album creation service based on image data provided by a client as the image processing apparatus of the present invention.

Further, it is also possible to implement the present invention by performing processing below. That is, processing to supply software (e.g., a program) that implements the functions of the above-described embodiments to a system or an apparatus via a network or various storage media and to cause a computer (or, CPU, MPU, or the like) of the system or the apparatus to read and to execute the program. It may also be possible to cause one computer to execute the program, or a plurality of computers to execute the program in an interlocking manner. It is not necessary to implement all of the processing described above by software and it may also be possible to implement a part or all of the processing by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor causing the image processing apparatus to act as:
(a) an acquisition unit configured to acquire a plurality of images;
(b) a determination unit configured to determine a template on which one or more images selected from the plurality of images are arranged; and
(c) a layout unit configured to arrange the selected one or more images in slots within the determined template,
wherein, in a case when the determined template includes a background slot and a foreground slot that overlaps a part of the background slot, the layout unit arranges, into the background slot, a first image out of the selected one or more images and also arranges, into the foreground slot, the first image.

2. The image processing apparatus according to claim 1, further comprising a division unit configured to divide images acquired by the acquisition unit into a plurality of image groups,
wherein the determination unit determines a template for each of the image groups.

3. The image processing apparatus according to claim 2, further comprising a selection unit configured to select images to be arranged on each determined template for each of the image groups divided by the division unit.

4. The image processing apparatus according to claim 3, wherein the determination unit determines a first template as a template for a first image group of the divided image groups, and
the selection unit selects all images included in the first image group as images to be arranged on the first template.

5. The image processing apparatus according to claim 1, wherein the layout unit arranges, in a case when the determined template includes the background slot and a plurality of foreground slots each overlapping part of the background slot, one of a plurality of images to be arranged in each of the plurality of foreground slots in the background slot.

6. The image processing apparatus according to claim 1, wherein on the determined template, the background slot is provided across a double-page spread page and the entire area of the foreground slot overlaps the background slot.

7. The image processing apparatus according to claim 1, wherein, in a case when the background slot of the determined template is provided on one page of a double-page spread and does not stretch to the other page, an image of a foreground slot that is provided on the other page and that does not overlap the background slot is not arranged in the background slot.

8. The image processing apparatus according to claim 1, wherein predetermined effect processing is performed on the first image arranged in the background slot and the predetermined effect processing is not performed on the first image arranged in the foreground slot.

9. The image processing apparatus according to claim 1, wherein the layout unit arranges a plurality of images on a template based on information attached to the images.

10. The image processing apparatus according to claim 1, wherein the layout unit arranges a plurality of images on a template based on results of analyzing the images.

11. The image processing apparatus according to claim 1, further comprising a unit configured to output image data of results by the layout unit performing a layout.

12. A non-transitory computer readable storage medium storing a program for causing one or more computers to function as each unit of an image processing apparatus, the image processing apparatus comprising:
at least one processor causing the image processing apparatus to act as:
(a) an acquisition unit configured to acquire a plurality of images;
(b) a determination unit configured to determine a template on which one or more images selected from the plurality of images are arranged; and
(c) a layout unit configured to arrange the selected one or more images in slots within the determined template,
wherein, in a case when the determined template includes a background slot and a foreground slot that overlaps a part of the background slot, the layout unit arranges, into the background slot, a first image out of the selected one or more images and also arranges, into the foreground slot, the first image.

13. The storage medium according to claim 12, wherein the image processing apparatus further comprises a division unit configured to divide images acquired by the acquisition unit into a plurality of image groups, and
the determination unit determines a template for each of the image groups.

14. The storage medium according to claim 13, wherein the image processing apparatus further comprises a selection unit configured to select images to be arranged on each determined template for each of the image groups divided by the division unit.

15. The storage medium according to claim 14, wherein the determination unit determines a first template as a template for a first image group of the divided image groups, and
the selection unit selects all images included in the first image group as images to be arranged on the first template.

16. The storage medium according to claim 12, wherein the layout unit arranges, in a case when the determined template includes the background slot and a plurality of foreground slots each overlapping part of the background slot, one of a plurality of images to be arranged in each of the plurality of foreground slots in the background slot.

17. The storage medium according to claim 12, wherein, on the determined template, the background slot is provided across a double-page spread page and the entire area of the foreground slot overlaps the background slot.

18. The storage medium according to claim 12, wherein, in a case when the background slot of the determined template is provided on one page of a double-page spread and does not stretch to the other page, an image of a foreground slot that is provided on the other page and that does not overlap the background slot is not arranged in the background slot.

19. The storage medium according to claim 12, wherein predetermined effect processing is performed on the first image arranged in the background slot and the predetermined effect processing is not performed on the first image arranged in the foreground slot.

20. The storage medium according to claim 12, wherein the layout unit arranges a plurality of images on a template based on information attached to the images.

21. The storage medium according to claim 12, wherein the layout unit arranges a plurality of images on a template based on results of analyzing the images.

22. The storage medium according to claim 12, wherein the image processing apparatus further comprises a unit configured to output image data of results by the layout unit performing a layout.

23. An image processing method comprising:
(a) acquiring a plurality of images;
(b) determining a template on which one or more images selected from the plurality of images are arranged; and
(c) arranging the selected one or more images in slots within the determined template,
wherein, in a case when the determined template includes a background slot and a foreground slot that overlaps a part of the background slot, the arranging arranges, into the background slot, a first image out of the selected one or more images and also arranges, into the foreground slot, the first image.

24. The image processing apparatus according to claim 1, wherein the first image arranged in the background slot is larger than the first image arranged in the foreground slot.

25. The image processing apparatus according to claim 1, wherein the first image arranged in the background slot is an image obtained by trimming a part of the first image.

26. The storage medium according to claim 12, wherein the first image arranged in the background slot is larger than the first image arranged in the foreground slot.

27. The storage medium according to claim 12, wherein the first image arranged in the background slot is an image obtained by trimming a part of the first image.

28. The image processing method according to claim 23, wherein the first image arranged in the background slot is larger than the first image arranged in the foreground slot.

29. The image processing method according to claim 23, wherein the first image arranged in the background slot is an image obtained by trimming a part of the first image.

* * * * *